United States Patent
Guo et al.

(10) Patent No.: US 12,461,214 B2
(45) Date of Patent: Nov. 4, 2025

(54) ULTRASOUND IMAGING SYSTEM AND METHOD THEREOF

(71) Applicant: SHENZHEN MINDRAY BIO-MEDICAL ELECTRONICS CO., LTD., Guangdong (CN)

(72) Inventors: Chongchong Guo, Shenzhen (CN); Bo Yang, Shenzhen (CN)

(73) Assignee: Shenzhen Mindray Bio-Medical Electronics Co., Ltd., Shenzhen (CN)

(*) Notice: Subject to any disclaimer, the term of this patent is extended or adjusted under 35 U.S.C. 154(b) by 26 days.

(21) Appl. No.: 18/381,562

(22) Filed: Oct. 18, 2023

(65) Prior Publication Data

US 2024/0142592 A1 May 2, 2024

(30) Foreign Application Priority Data

Oct. 31, 2022 (CN) .......................... 202211352083.1

(51) Int. Cl.
*G01S 7/52* (2006.01)
*A61B 8/00* (2006.01)
*A61B 8/14* (2006.01)
*G06T 1/20* (2006.01)

(52) U.S. Cl.
CPC ............ *G01S 7/52085* (2013.01); *A61B 8/14* (2013.01); *A61B 8/4488* (2013.01); *A61B 8/54* (2013.01); *G01S 7/52019* (2013.01); *G01S 7/52057* (2013.01); *G06T 1/20* (2013.01)

(58) Field of Classification Search
CPC ............ G01S 7/52085; G01S 7/52019; G01S 7/52057; G01S 7/52082; G01S 7/52084; A61B 8/14; A61B 8/4488; A61B 8/54; A61B 8/469; A61B 8/465; A61B 8/5207; A61B 8/44; G06T 1/20
See application file for complete search history.

(56) References Cited

U.S. PATENT DOCUMENTS

2012/0004545 A1* 1/2012 Ziv-Ari ................ A61B 8/0883
600/437
2018/0206820 A1* 7/2018 Anand ................ G01S 7/52085

* cited by examiner

*Primary Examiner* — Bo Joseph Peng
(74) *Attorney, Agent, or Firm* — Sheppard Mullin Richter & Hampton LLP

(57) ABSTRACT

An ultrasonic imaging system and a method thereof are disclosed, in which a FPGA and a GPU are designed for beam forming according to different requirements, for example including but not limited to: configuring the FPGA and the GPU to jointly perform an identical beam forming procedure on the same group of channel echo data to improve frame rate; configuring the FPGA and the GPU to perform different beam forming procedures on the same group of channel echo data respectively to improve image quality; configuring the FPGA and the GPU to process the channel echo data alternately; etc. Through such design and the configuration of FPGA and GPU in regard to beam forming, the frame rate and/or image quality can be improved while considering cost and power consumption.

13 Claims, 8 Drawing Sheets

ULTRASOUND IMAGING SYSTEM AND METHOD THEREOF

CROSS-REFERENCE TO RELATED APPLICATIONS

This application is based on and claims priority to and benefits of Chinese Patent Application No. 202211352083.1 filed on Oct. 31, 2022. The entire content of the above-referenced application is incorporated herein by reference.

TECHNICAL FIELD

The present disclosure relates to ultrasonic imaging, and in particular to ultrasonic imaging systems and ultrasonic imaging methods.

BACKGROUND

Ultrasonic imaging widely used in clinical diagnosis and routine health examination at present has irreplaceable advantages over other typical imaging techniques such as computed tomography imaging, magnetic resonance imaging, etc. In ultrasonic imaging, beam forming is a key link that affects image performance and has a crucial impact on the quality of final imaging.

In order to improve image quality, the industry has developed a variety of methods for beam forming; however, the current research mainly focuses on beam forming procedures, neglecting the research on hardware.

SUMMARY

In regard to the above issues, the present disclosure provides ultrasonic imaging systems and ultrasonic imaging methods, which will be explained in detail below.

According to a first aspect, an ultrasonic imaging system provided in an embodiment may include:
- an ultrasonic probe having a plurality of array elements and configured to transmit ultrasonic waves to a region of interest and receive channel echo data corresponding to the ultrasonic waves;
- a transmitting and receiving control circuit configured to control the ultrasonic probe to perform transmission of the ultrasonic waves and reception of the channel echo data;
- a beam former including a FPGA and a GPU and configured to perform beam forming on the channel echo data by the FPGA and the GPU to obtain beam-formed data;
- an image processor configured to generate an ultrasonic image according to the beam-formed data; and
- a display configured to display the ultrasonic image;
- wherein the beam former has a plurality of beam forming work modes;
- the display is capable of displaying the plurality of beam forming work modes for a user to select a current beam forming work mode; and
- the beam former is capable of performing configuration about beam forming for the FPGA and the GPU under the current beam forming work mode so as to perform beam forming on the channel echo data to obtain the beam-formed data.

In an embodiment, the plurality of beam forming work modes comprise a first cooperative work mode; and the beam former is capable of performing configuration about beam forming for the FPGA and the GPU under the first cooperative work mode such that: the FPGA is capable of performing some steps of a first beam forming procedure and the GPU is capable of performing remaining steps of the first beam forming procedure so as to perform beam forming on the channel echo data cooperatively to obtain the beam-formed data.

In an embodiment, the first beam forming procedure is an adaptive beam forming procedure including a delay sequencing step, an apodized coefficient calculating step, a phase coefficient calculating step and a summing step;
- wherein, the FPGA is configured to perform the delay sequencing step and the summing step, and the GPU is configured to perform the apodized coefficient calculating step and the phase coefficient calculating step;
- or, the FPGA is configured to perform the delay sequencing step, and the GPU is configured to perform the apodized coefficient calculating step, the phase coefficient calculating step and the summing step.

In an embodiment, the plurality of beam forming work modes comprise a second cooperative work mode; and the beam former is capable of performing configuration about beam forming for the FPGA and the GPU under the second cooperative work mode such that for a same group of channel echo data:
- the FPGA is capable of performing beam forming on the same group of channel echo data with a first beam forming procedure to obtain a first group of beam-formed data, and
- the GPU is capable of performing beam forming on the same group of channel echo data with a second beam forming procedure to obtain a second group of beam-formed data; and
- the beam former is capable of obtaining beam-formed data corresponding to the same group of channel echo data based on the first group of beam-formed data and the second group of beam-formed data.

In an embodiment, the beam former being capable of obtaining beam-formed data corresponding to the same group of channel echo data based on the first group of beam-formed data and the second group of beam-formed data comprises:
- the beam former being capable of performing compounding to obtain the beam-formed data corresponding to the same group of channel echo data based on the first group of beam-formed data and the second group of beam-formed data; or,
- the beam former being capable of selecting one from the first group of beam-formed data and the second group of beam-formed data as the beam-formed data corresponding to the same group of channel echo data.

In an embodiment, the plurality of beam forming work modes comprise a third cooperative work mode; and the beam former is capable of performing configuration about beam forming for the FPGA and the FPGA under the third cooperative work mode such that: the FPGA and the GPU are configured to perform beam forming on different groups of channel echo data respectively to obtain the beam-formed data.

In an embodiment, the FPGA is configured to perform beam forming on channel echo data of first type to obtain beam-formed data of first type, the GPU is configured to perform beam forming on channel echo data of second type to obtain beam-formed data of second type; and
- the image processor is configured to generate an ultrasonic image of first type based on the beam-formed data of first type and generate an ultrasonic image of second type based on the beam-formed data of second type.

In an embodiment, the ultrasonic image of first type is a B-mode image, and the ultrasonic image of second type is a contrast enhanced ultrasonic image, a C-mode image or an elasticity image;
or, the ultrasonic image of second type is a B-mode image, and the ultrasonic image of first type is a contrast enhanced ultrasonic image, a C-mode image or an elasticity image.

In an embodiment, channel echo data corresponding to a same scanning frame is a same group of channel echo data; or channel echo data corresponding to a same scanning line is a same group of channel echo data.

According to a second aspect, an ultrasonic imaging system provided in an embodiment may include:
an ultrasonic probe having a plurality of array elements and configured to transmit ultrasonic waves to a region of interest and receive channel echo data corresponding to the ultrasonic waves;
a transmitting and receiving control circuit configured to control the ultrasonic probe to perform transmission of the ultrasonic waves and reception of the channel echo data;
a beam former configured to perform beam forming on the channel echo data to obtain beam-formed data, and having a FPGA configured to perform at least some steps of beam forming performed by the beam former and a GPU configured to perform at least some steps of beam forming performed by the beam former;
an image processor configured to generate an ultrasonic image according to the beam-formed data; and
a display configured to display the ultrasonic image.

In an embodiment, the beam former is capable of performing beam forming on the channel echo data with one or more beam forming procedures, wherein:
the FPGA is capable of performing all steps of at least one of the beam forming procedures so as to perform beam forming on the channel echo data to obtain the beam-formed data, and/or,
the GPU is capable of performing all steps of at least one of the beam forming procedures so as to perform beam forming on the channel echo data to obtain the beam-formed data.

In an embodiment, for a same group of channel echo data:
the FPGA is configured to perform beam forming on a first part data of the same group of channel echo data to obtain beam-formed data corresponding to the first part data; and
the GPU is configured to perform beam forming on a remaining second part data of the same group of channel echo data to obtain beam-formed data corresponding to the second part data.

In an embodiment, the same group of channel echo data comprises channel echo data received by the plurality of array elements of the ultrasonic probe, wherein:
the first part data is channel echo data received by a first part of the plurality of array elements, and the second part data is channel echo data received by a remaining second part of the plurality of array elements.

In an embodiment, the same group of channel echo data comprises channel echo data corresponding to a plurality of receiving lines, wherein:
the first part data is channel echo data received by a first part of the plurality of receiving lines, and the second part data is channel echo data received by a remaining second part of the plurality of receiving lines.

In an embodiment, the same group of channel echo data comprises channel echo data corresponding to receiving points with different depths, wherein:
the first part data is channel echo data corresponding to a first part of the receiving points with different depths, and the second part data is channel echo data corresponding to a remaining second part of the receiving points with different depths.

In an embodiment, the FPGA and the GPU are configured to perform beam forming on different groups of channel echo data respectively to obtain the beam-formed data.

In an embodiment, the FPGA and the GPU are configured to perform beam forming on different groups of channel echo data alternately to obtain the beam-formed data.

In an embodiment, the FPGA is configured to perform beam forming on channel echo data of first type to obtain beam-formed data of first type, the GPU is configured to perform beam forming on channel echo data of second type to obtain beam-formed data of second type; and
the image processor is configured to generate an ultrasonic image of first type based on the beam-formed data of first type and generate an ultrasonic image of second type based on the beam-formed data of second type.

In an embodiment, the first-typed ultrasonic image is a B-mode image, and the second-typed ultrasonic image is a contrast enhanced ultrasonic image, a C-mode image or an elasticity image; or,
the second-typed ultrasonic image is a B-mode image, and the first-typed ultrasonic image is a contrast enhanced ultrasonic image, a C-mode image or an elasticity image.

In an embodiment, the FPGA is capable of performing all steps of a first beam forming procedure and the GPU is capable of performing all steps of a second beam forming procedure; and for a same group of channel echo data:
the FPGA is capable of performing beam forming on the same group of channel echo data with the first beam forming procedure to obtain a first group of beam-formed data, and
the GPU is capable of performing beam forming on the same group of channel echo data with the second beam forming procedure to obtain a second group of beam-formed data; and
the beam former is capable of obtaining beam-formed data corresponding to the same group of channel echo data based on the first group of beam-formed data and the second group of beam-formed data.

In an embodiment, the beam former being capable of obtaining beam-formed data corresponding to the same group of channel echo data based on the first group of beam-formed data and the second group of beam-formed data comprises:
the beam former being capable of performing compounding to obtain the beam-formed data corresponding to the same group of channel echo data based on the first group of beam-formed data and the second group of beam-formed data; or,
the beam former being capable of selecting one from the first group of beam-formed data and the second group of beam-formed data as the beam-formed data corresponding to the same group of channel echo data.

In an embodiment, the beam former is capable of performing beam forming on the channel echo data with one or more beam forming procedures, wherein:

the FPGA is capable of performing some steps of at least one of the beam forming procedures and the GPU is capable of performing remaining steps of the at least one of the beam forming procedures, so as to perform beam forming on the channel echo data.

In an embodiment, the FPGA is capable of performing some steps of an adaptive beam forming procedure and the GPU is capable of performing remaining steps of the adaptive beam forming procedure so as to perform beam forming on the channel echo data; the adaptive beam forming procedure comprises a delay sequencing step, an apodized coefficient calculating step, a phase coefficient calculating step and a summing step, in which:

the FPGA is configured to perform the delay sequencing step and the summing step, and the GPU is configured to perform the apodized coefficient calculating step and the phase coefficient calculating step;

or, the FPGA is configured to perform the delay sequencing step, and the GPU is configured to perform the apodized coefficient calculating step, the phase coefficient calculating step and the summing step.

In an embodiment, channel echo data corresponding to a same scanning frame is a same group of channel echo data; or channel echo data corresponding to a same scanning line is a same group of channel echo data.

According to a third aspect, an ultrasonic imaging method provided in an embodiment may include:

transmitting ultrasonic waves to a region of interest;
receiving channel echo data corresponding to the ultrasonic waves;
performing beam forming on the channel echo data by a FPGA and a GPU to obtain beam-formed data;
generating an ultrasonic image according to the beam-formed data; and
displaying the ultrasonic image;
wherein a plurality of beam forming work modes are displayed for a user to select a current beam forming work mode; and
the FPGA and the GPU are configured in regard for beam forming according to the current beam forming work mode so as to perform beam forming on the channel echo data to obtain the beam-formed data.

In an embodiment, the plurality of beam forming work modes comprises a first cooperative work mode, and
the FPGA and the GPU being configured in regard to beam forming according to the current beam forming work mode comprises: under the first cooperative work mode, the FPGA being capable of performing some steps of a first beam forming procedure and the GPU being capable of performing remaining steps of the first beam forming procedure so that the channel echo data is beam formed cooperatively by the FPGA and the GPU to obtain the beam-formed data.

In an embodiment, the plurality of beam forming work modes comprises a second cooperative work mode, and
the FPGA and the GPU being configured in regard to beam forming according to the current beam forming work mode comprises: configuring the FPGA and the GPU in regard to beam forming such that for a same group of channel echo data:
the FPGA performs beam forming on the same group of channel echo data with a first beam forming procedure to obtain a first group of beam-formed data, and
the GPU performs beam forming on the same group of channel echo data with a second beam forming procedure to obtain a second group of beam-formed data; and the beam former obtains beam-formed data corresponding to the same group of channel echo data based on the first group of beam-formed data and the second group of beam-formed data.

In an embodiment, the plurality of beam forming work modes comprises a third cooperative work mode,
the FPGA and the GPU being configured in regard to beam forming according to the current beam forming work mode comprises: the FPGA and the FPGA being configured to perform beam forming on different groups of channel echo data respectively to obtain the beam-formed data, in which: the FPGA performs beam forming on channel echo data of first type to obtain beam-formed data of first type, and the GPU performs beam forming on channel echo data of second type to obtain beam-formed data of second type; and
generating an ultrasonic image according to the beam-formed data comprises: generating an ultrasonic image of first type based on the beam-formed data of first type and generating an ultrasonic image of second type based on the beam-formed data of second type.

According to a fourth aspect, an ultrasonic imaging method provided in an embodiment may include:
transmitting ultrasonic waves to a region of interest;
receiving channel echo data corresponding to the ultrasonic waves;
performing beam forming on the channel echo data by a FPGA performing at least some steps of beam forming and by a GPU performing at least some steps of beam forming so as to obtain beam-formed data;
generating an ultrasonic image according to the beam-formed data; and
displaying the ultrasonic image.

In an embodiment, performing beam forming on the channel echo data by a FPGA performing at least some steps of beam forming and by a GPU performing at least some steps of beam forming so as to obtain beam-formed data comprises: for a same group of channel echo data:
performing beam forming on a first part data of the same group of channel echo data by the FPGA performing all steps of a beam forming procedure to obtain beam-formed data corresponding to the first part data; and
performing beam forming on a remaining second part data of the same group of channel echo data by the GPU performing all steps of a beam forming procedure to obtain beam-formed data corresponding to the second part data.

In an embodiment, performing beam forming on the channel echo data by a FPGA performing at least some steps of beam forming and by a GPU performing at least some steps of beam forming so as to obtain beam-formed data comprises:
performing beam forming on different groups of channel echo data alternately by the FPGA performing all steps of a beam forming procedure and by the GPU performing all steps of a beam forming procedure so as to obtain the beam-formed data.

In an embodiment, performing beam forming on different groups of channel echo data alternately by the FPGA performing all steps of a beam forming procedure and by the GPU performing all steps of a beam forming procedure so as to obtain the beam-formed data comprises: performing beam forming on channel echo data of first type by the FPGA to obtain beam-formed data of first type, and performing beam forming on channel echo data of second type by the GPU to obtain beam-formed data of second type; and generating an ultrasonic image according to the beam-formed data comprises: generating an ultrasonic image of first type based on the beam-formed data of first type and generating an ultrasonic image of second type based on the beam-formed data of second type.

In an embodiment, performing beam forming on the channel echo data by a FPGA performing at least some steps of beam forming and by a GPU performing at least some steps of beam forming so as to obtain beam-formed data comprises: for a same group of channel echo data:
performing beam forming on the same group of channel echo data by the FPGA performing all steps of a first beam forming procedure to obtain a first group of beam-formed data,
performing beam forming on the same group of channel echo data by the GPU performing all steps of a second beam forming procedure to obtain a second group of beam-formed data, and
obtaining beam-formed data corresponding to the same group of channel echo data based on the first group of beam-formed data and the second group of beam-formed data.

In an embodiment, performing beam forming on the channel echo data by a FPGA performing at least some steps of beam forming and by a GPU performing at least some steps of beam forming so as to obtain beam-formed data comprises:
performing beam forming on the channel echo data cooperatively by the FPGA performing some steps of a beam forming procedure and the GPU performing remaining steps of the beam forming procedure.

With the ultrasonic imaging systems and methods thereof in accordance with the above embodiments, the FPGA and the GPU are designed for beam forming according to different requirements, for example including but not limited to: configuring the FPGA and the GPU to jointly perform an identical beam forming procedure on the same group of channel echo data to improve frame rate; configuring the FPGA and the GPU to perform different beam forming procedures on the same group of channel echo data respectively to improve image quality; configuring the FPGA and the GPU to process the channel echo data alternately; etc. Through such design and the configuration of FPGA and GPU in regard to beam forming, the frame rate and/or the image quality can be improved while considering cost and power consumption.

DETAILED DESCRIPTION

Figure 1A:
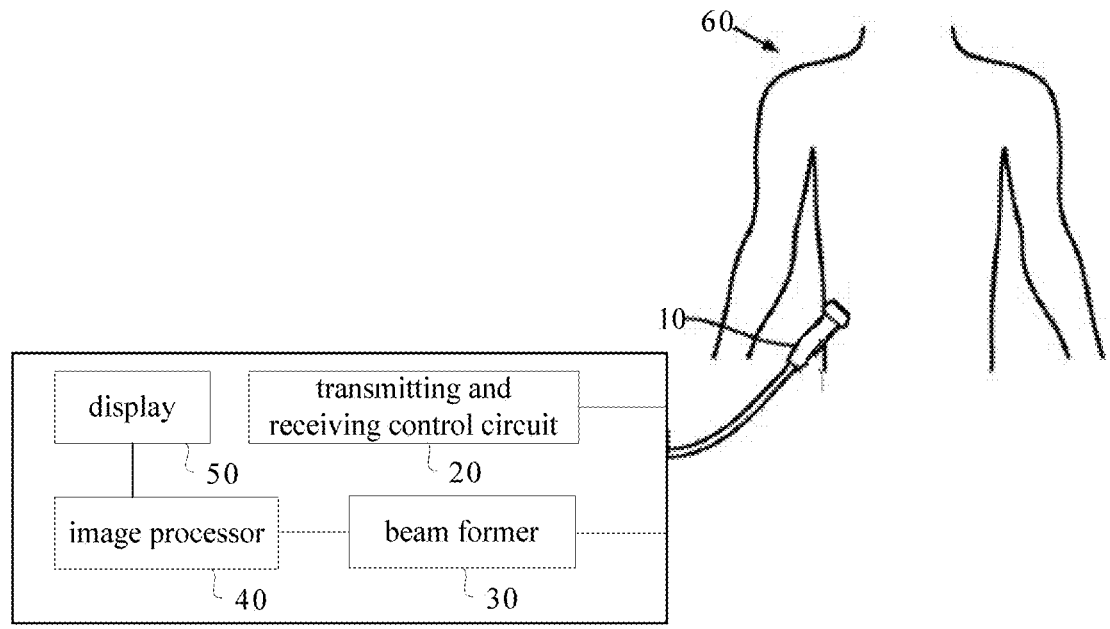
FIG. 1(a) is a schematically structural diagram of an ultrasonic imaging system in an embodiment.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

An explanation and introduction to the hardware structure of an ultrasonic imaging system is first provided below.

Figure 1B:
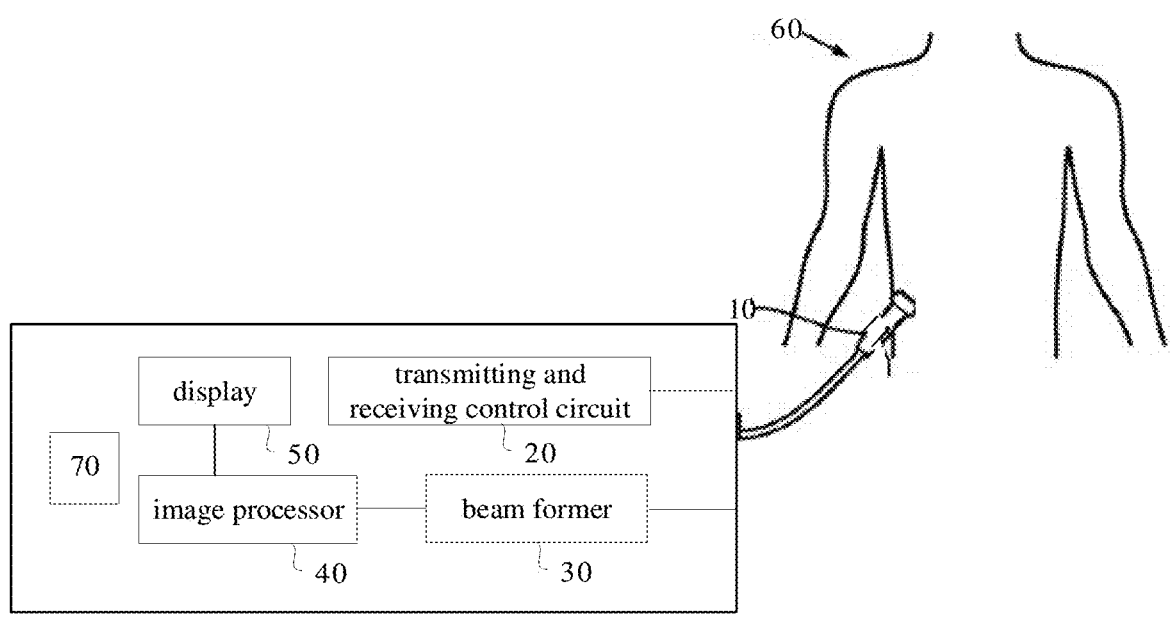
FIG. 1(b) is a schematically structural diagram of an ultrasonic imaging system in another embodiment.

Referring to FIG. 1(a) or FIG. 1(b), an ultrasonic imaging system in an embodiment may include an ultrasonic probe 10, a transmitting and receiving control circuit 20, a beam former 30, an image processor 40 and a display 50. The ultrasonic imaging system in another embodiment may also include a human-computer interaction unit 70. Below is a more specific explanation of each component.

The ultrasonic probe 10 may be used to transmit ultrasonic waves to a region of interest and receive channel echo data corresponding to the ultrasonic waves. In an embodiments, the ultrasonic probe 10 may include a plurality of array elements. The ultrasonic probe 10 may be for example a linear array probe in which the array elements are arranged into a row, or a planar array probe in which the array elements are arranged into a two-dimensional matrix. The array elements may also be arranged to make the ultrasonic probe 10 be a convex array probe. The array elements (for example using piezoelectric crystals) may convert electrical signals into ultrasonic signals in accordance with a transmission sequence transmitted by the transmitting and receiving control circuit 20. The ultrasonic signals may, depending on applications, include one or more scanning pulses, one or more reference pulses, one or more impulse pulses and/or one or more Doppler pulses. According to the pattern of waves, the ultrasonic signals may include a focused wave, a plane wave and a divergent wave. The array elements may be configured to transmit an ultrasonic beam according to an excitation electrical signal or convert a received ultrasonic beam into an electrical signal. Each array element can accordingly be configured to achieve a mutual conversion between an electrical pulse signal and an ultrasonic beam, thereby achieving the transmission of ultrasonic waves to a biological tissue 60, and can also be configured to receive ultrasonic echo signals reflected back by the tissue. During ultrasonic detection, the transmitting and receiving control circuit 20 can be used to control which array elements are used for transmitting the ultrasonic beam (referred to as transmitting array elements) and which array elements are used for receiving the ultrasonic beam (referred to as receiving array elements), or to control the array elements to be used for transmitting the ultrasonic beam or receiving echoes of the ultrasonic beam in time slots. The array elements involved in transmission of ultrasonic waves can be excited by electric signals at the same time, so as to emit ultrasonic waves simultaneously; alternatively, the array element involved in transmission of ultrasonic waves can also be excited by a number of electric signals with a certain time interval, so as to continuously emit ultrasonic waves with a certain time interval. If the minimum processing area for receiving and reflecting ultrasonic waves in the biological tissue 60 is referred to as a location point within the tissue, after reaching each location point of the biological tissue 60, the ultrasonic waves may generate different reflections due to the different acoustic impedance of the tissue at different location points; then the reflected ultrasonic waves may be picked up by the receiving array elements, and each receiving array element may receive ultrasonic echoes of a plurality of location points. The ultrasonic echoes of different location points received by each receiving array element may form different channel echo data. For a certain receiving array element, the distance from the receiving array element to different location points of the biological tissue 60 is different, so the time when the ultrasonic echoes reflected by each location point reach the array element is also different; accordingly, a the corresponding relationship between the ultrasonic echoes and the location point can be identified according to the time when the ultrasonic echoes reach the array element.

For the convenience of discussion, the ultrasonic probe 10 receiving the channel echo data of the ultrasonic waves herein refers to receiving echo signals of the ultrasonic waves and forming the channel echo data; and the "channel echo data" mentioned herein refers to the data corresponding to the channels of the ultrasonic imaging system (corresponding to one or more array elements) before beam forming, for example, it may be either a RF signal before demodulation or a baseband signal after demodulation, and so on.

In some embodiments, the channel echo data corresponding to an identical scanning frame is the same group of channel echo data; or the channel echo data corresponding to an identical scanning line is the same group of channel echo data.

In some embodiments, the same group of channel echo data may comprise the channel echo data received by the plurality of array elements in the ultrasonic probe 10.

In some embodiments, the same group of channel echo data may comprise the channel echo data corresponding to a plurality of receiving lines.

In some embodiments, the same group of channel echo data may comprise the channel echo data corresponding to receiving points with different depths.

The transmitting and receiving control circuit 20 may be used to control the ultrasonic probe 10 to perform transmission of the ultrasonic waves and reception of the channel echo data. For example, on the one hand, the transmitting and receiving control circuit 20 is used to control the ultrasonic probe 10 to transmit the ultrasonic waves to the biological tissue 60 (e.g. the region of interest), and on the other hand, it is used to control the ultrasonic probe 10 to receive the echo signals of the ultrasonic waves reflected by the tissue to form the channel echo data. In some embodiments, the transmitting and receiving control circuit 20 is used to generate transmission sequences and receiving sequences and output them to the ultrasonic probe 10. The transmission sequences may be used to control part or all of the array elements of the ultrasonic probe 10 to transmit the ultrasonic waves to the biological tissue 60, and the parameters of the transmission sequences may include the number of the transmitting array elements and transmitting parameters of the ultrasonic waves (e.g. amplitude, frequency, number of transmissions, transmission interval, transmission angle, wave pattern and/or focus position, etc.). The receiving sequences may be used to control part or all of the array elements to receive echoes of the ultrasonic waves reflected by the tissue, and the parameters of the receiving sequences may include the number of the receiving array elements and receiving parameters of the echoes (e.g., receiving angle, depth, etc.). The parameters of the ultrasonic waves of the transmission sequences and the parameters of the echoes of the receiving sequences vary depending on the purpose of ultrasonic echoes or the images generated by ultrasonic echoes.

The beam former 30 may be used to perform beam forming on the channel echo data to obtain the beam-formed data. In some embodiments, the beam former 30 may output the processed signals or data to the image processor 40, or it may first store the processed signals or data to a memory and then read out echo signals or data from the memory when it is necessary to perform calculations based on the echo signals.

Figure 2A:
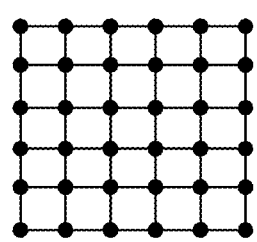
FIG. 2(a) is a schematic diagram of beam-formed points of a linear array probe in an embodiment.
Figure 2B:
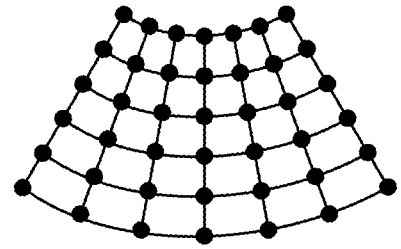
FIG. 2(b) is a schematic diagram of beam-formed points of a convex array probe in another embodiment.

The ultrasonic probe 10 may receive the signals of the ultrasonic waves reflected by the region of interest (i.e., the ultrasonic echo signals) and then convert the ultrasonic echo signals or the ultrasonic echoes into the channel echo data of the ultrasonic waves. Beam forming may refer to reconstructing the channel echo data from a channel domain (the data dimension thereof is for example: time direction*number of channels*number of transmissions) to data in a beam domain (i.e., beam-formed data, and the data dimension thereof is: number of vertical points*number of horizontal lines, wherein the points are those in actual physical space). Beam-formed points may refer to each output point in the beam domain, for example, FIG. 2(*a*) schematically shows the beam-formed points of a linear array probe, and FIG. 2(*b*) schematically shows the beam-formed points of a convex array probe. In FIG. 2(*a*) and FIG. 2(*b*), the grid formed by the beam-formed points may also be referred to as a receiving-line grid, and the beam-formed points may be the grid points on the receiving-line grid. Therefore, beam forming mentioned above may refer to reconstructing and converting the channel echo data from the channel domain to data in the beam domain; and specifically the data dimension of the channel echo data of the ultrasonic waves may be $N_t*N_{ch}*N_{tx}$, $N_t$ may represent the time direction along which ultrasonic waves propagate, $N_{ch}$ may represent the number of channels, and $N_{tx}$ may represent the number of transmissions. After beam formed, it may turn to the data in the beam domain, and the data dimension of the data in the beam domain may be $N_{rang}*N_{usl}$, where $N_{rang}$ may represent the vertical points on the receiving-line grid, and $N_{usl}$ may represent the horizontal points on the receiving-line grid.

In ultrasonic imaging, a two-dimensional image is obtained by arranging multiple beam-formed points in a two-dimensional plane according to spatial positional relationships and performing envelope detection, dynamic range compression, and digital scan conversion (DSC) operations on the beam-formed points.

The image processor 40 may be used to generate an ultrasonic image based on the beam-formed data. For example, after obtaining the beam-formed data, the image processor 40 may perform spatial compounding on the beam-formed data to obtain ultrasonic image frame data.

The display 50 may be used to display the ultrasonic image.

The human-computer interaction unit 70 for receiving an instruction inputted by a user may include, but be not limited to, a keyboard, a mouse, a trackball, etc. The human-computer interaction unit 70 may also be a touch screen; and in this case, the human-computer interaction unit 70 and the display 50 may be integrated together such that the user can directly input the instruction by clicking the screen. In some embodiments, before performing ultrasound imaging, imaging settings may be performed by the user via the human-computer interaction unit 70. The imaging settings may include but be not limited to the probe type of the ultrasonic probe 10, the scanning mode of the ultrasonic probe 10, the type of the biological tissue under examination, and the imaging parameter(s) of ultrasound imaging. The probe type may include but be not limited to a high-frequency probe, a low-frequency probe, a phased array probe, a volumetric probe, a two-dimensional matrix probe, a conventional linear array probe, a conventional convex array probe, etc. The scanning mode may include but be not limited to linear array scanning, sector scanning, extended scanning, volume scanning (3D scanning), etc. The type of the biological tissue under examination may refer to the type of a scanning object to be expected for the ultrasound examination, such as a small organ, a fine tissue, an organ with clear boundary, a relatively uniform organ tissue, a complex structural tissue, a relatively fast moving tissue, etc., specifically it may be thyroid, mammary gland, nerves, abdomen, heart, liver, kidney, musculoskeletal, etc. The imaging parameter (s) may refer to any parameter(s) currently used in ultrasound imaging, including but not limited to a frequency (i.e., the number of the transmitted ultrasonic waves), an aperture, a focal point, an imaging depth, a gain, settings of transmitting line and receiving line, number of transmissions, etc. If no imaging settings is carried out by the user, default imaging settings may also be entered.

The above are some explanations of the ultrasonic imaging system. Below is a further explanation of beam forming.

In some embodiments, the beam former 30 may adopt a plurality of beam forming procedures, including but not limited to a delay and sum (DAS) beam forming procedure, an adaptive beam forming procedure, a coherent beam forming procedure, and/or an incoherent beam forming procedure, or a frequency domain beam forming procedure.

In some embodiments, when referring to "different beam forming procedures" or "a plurality of beam forming procedures", it may mean that there is at least one difference in theories, steps, parameters therein. For example, different beam forming algorithms (theories), or same algorithm (theory) with different steps (such as increasing or decreasing steps or changing the order of steps, etc.), or different used parameters; the beam forming procedures under such cases may be regarded as "different" or "various" beam forming procedures.

Figure 3:
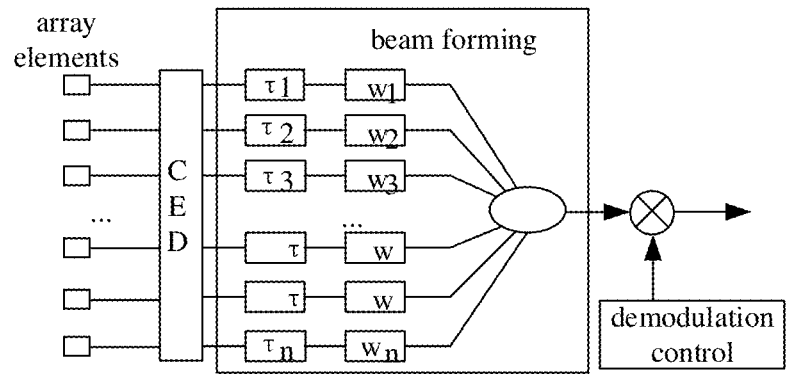
FIG. 3 is a schematic diagram of a delay and sum (DAS) beam forming procedure in an embodiment.

Referring to FIG. 3, the DAS procedure is a common beam forming procedure, in which each channel echo data (CED) is aligned according to a corresponding delay time, and the aligned channel data may be performed with apodization and weighted sum. The apodization coefficient thereof is a group of preset window functions, such as rectangular window, Hanning window and Gaussian window. Because this method is simple in principle and easy to implement, it is widely used in the ultrasonic imaging system; and the characteristics of the method are that the apodization weight is a preset group of coefficients.

The DAS procedure is a delay and summation method based on channel echo data, in which it may need to cache a large amount of channel echo data, apply operations such as delay and apodization on the plurality of channel echo data, and perform accumulation, therefore there needs a high computing capability for the ultrasonic imaging system. With the development of ultrasonic imaging, more beam forming methods have been developed, such as adaptive beam forming procedure and coherent beam forming procedure. These methods often require more complex calculations. To ensure the real-time performance of ultrasound imaging, the ultrasonic imaging system needs to have stronger data storage and computing capabilities.

Figure 4:
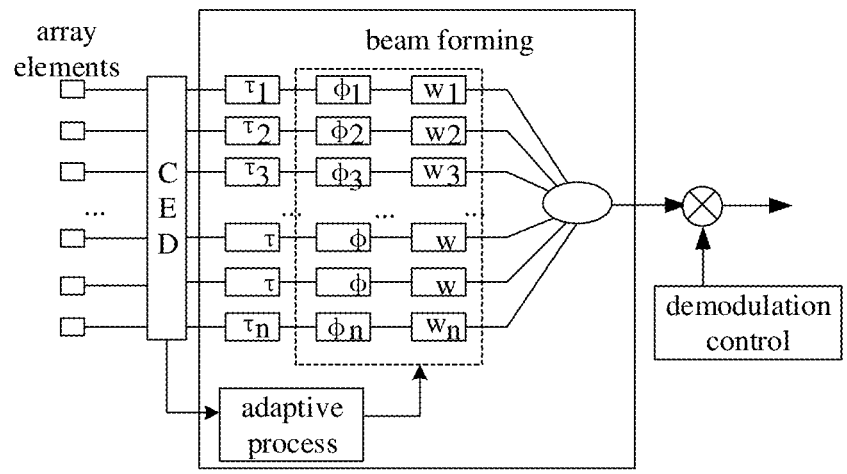
FIG. 4 is a schematic diagram of an adaptive beam forming procedure in an embodiment.

Please refer to FIG. 4, which shows the adaptive beam forming procedure. This procedure is to delay the channel echo data, then calculate a current weight coefficient using such as the minimum variance algorithm, and perform summation. This method can adaptively calculate weights based on the received channel echo data. The weight coefficients between each frame, the weight coefficients of each section, and the weight coefficients under each condition are different and are closely related to the received channel echo data. With adaptive calculation, the width of the main lobe can thereby be narrowed with reduced sidelobe level, which improves the spatial and contrast resolution of the image, and the effect is obvious when small lesions need to be displayed. However, this method also has higher requirements for data storage and computing power in the ultrasonic imaging system.

The coherent beam forming procedure is to calculate the coherence of the channel echo data or initial beam-formed data to obtain the coherence coefficient which is then multiplied onto the initial beam-formed data to output the result thereof as a final beam forming output. The principle of this procedure is that the coherence between the received echo signals is strong, and there is no coherence between the noise, so the calculation of the coherence coefficient can further improve the signals and suppress the noise. This method has a very good effect on strong reflection signals, such as tissue boundaries with strong echoes, which will further enhance image contrast.

Figure 5:
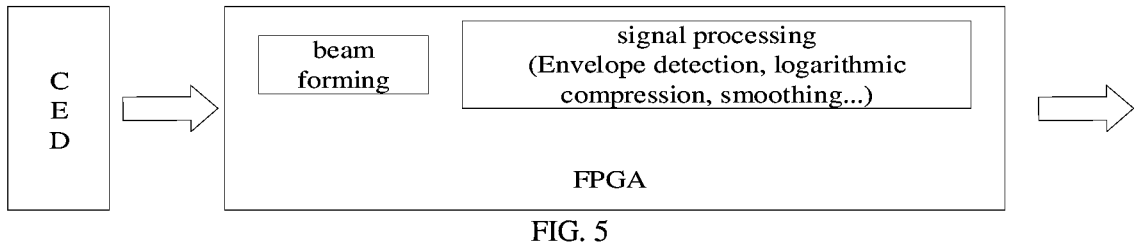
FIG. 5 is a schematic architecture diagram of a FPGA-based ultrasonic imaging system in an embodiment.

The applicant found that in most current ultrasonic imaging systems, the beam former 30 is implemented by a field programmable logic device (FPGA) which is a semi-customized circuit in ASIC and is a programmable logic array. The FPGA device relies on hardware to achieve all functions, with a speed comparable to that of a specialized chip and advantages of such as low cost, low energy consumption, and fast speed. However, it can only achieve fixed-point operations; and all functions rely on hardware, making it impossible to perform branch conditional jumps and other operations. Accordingly, the flexibility of its design lags far behind that of general-purpose processors. Usually, FPGA that is designed to implement conventional beam forming methods such as DAS may be difficult or impossible to implement new beam forming methods such as the adaptive beam forming procedure and the coherent beam forming procedure. For example, FIG. 5 shows a typical architecture of a FPGA-based ultrasonic imaging system.

To address the issue of design flexibility, the architecture of the ultrasonic imaging system may be designed based on a general-purpose processor, such as using a central processing unit (CPU) to achieve beam forming and signal processing (e.g., envelope detection, logarithmic compression, spatial smoothing). Such architecture has excellent flexibility, but is limited by the computing power of the CPU and cannot perform real-time imaging.

Figure 6A:
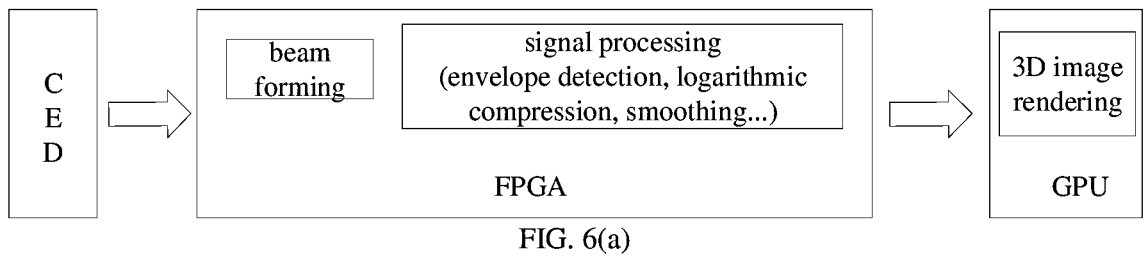
FIG. 6(a) is a schematic architecture diagram of an ultrasonic imaging system in an embodiment.
Figure 6B:
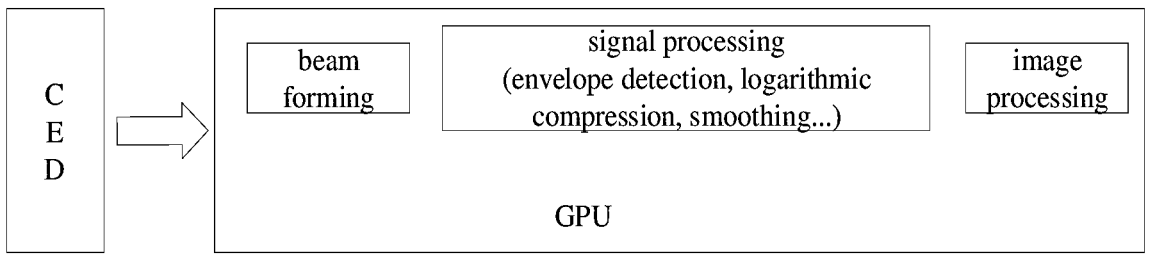
FIG. 6(b) is a schematic architecture diagram of a GPU-based ultrasonic imaging system in an embodiment.

With the development of a graphics processors (GPU), GPU in the architecture of an ultrasound system is becoming increasingly powerful. In some schemes, GPU appears as an auxiliary unit in the architecture of the ultrasonic imaging system, as shown in FIG. 6(a) which shows that GPU is used for processing such as 3D ultrasonic image rendering. In recent years, the computing power of GPU has significantly improved, and at the same time, GPU has good flexibility. The applicant believes that GPU can play a greater role in the architecture of the ultrasonic imaging system. FIG. 6(b) is an example where GPU replaces FPGA for beam forming and signal processing (such as envelope detection, logarithmic compression, spatial smoothing, etc.). However, the cost of GPU is relatively high, and the power consumption required by GPU is higher than that of FPGA under the same computing power. Correspondingly, the power supply, power consumption design and heat dissipation design will increase the complexity and cost of the ultrasonic imaging system, sometimes even at least doubling the cost. In other words, the computational power of the ultrasonic imaging system using GPU is lower than that of FPGA at the same cost, which can reduce the frame rate of the ultrasonic imaging and affect the image quality.

In order to obtain better ultrasonic image quality and build a high-performance ultrasonic imaging system, a new architecture of ultrasonic imaging system is proposed in some embodiments, which may include both a programmable logic device (FPGA) and a graphics processor (GPU). The architecture may contain one or more FPGA circuits and one or more GPU graphics cards. In some embodiments, beam forming and even signal processing can be jointly completed by FPGA and GPU; and the division of beam forming functions of FPGA and GPU may be various based on different application scenarios, which can be set according to needs, such as including but not limited to: FPGA and GPU jointly performing the same beam forming procedure on the same group of channel echo data to improve frame rate; FPGA and GPU performing different beam forming procedures on the same group of channel echo data to improve image quality; and FPGA and GPU process the channel echo data alternately, and so on.

Figure 7:
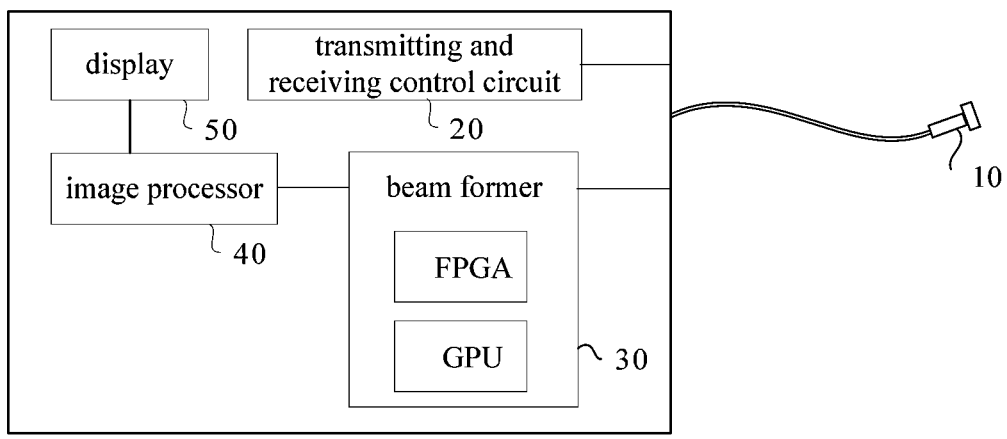
FIG. 7 is a schematically structural diagram of an ultrasonic imaging system in an embodiment.

Therefore, please refer to FIG. 7. In some embodiments, the beam former 30 includes a FPGA and a GPU, where the FPGA is used to perform at least some steps of beam forming adopted in the beam former 30, and the GPU is used to perform at least some steps of beam forming adopted in the beam former 30. In other words, the beam former 30 performs beam forming on the channel echo data by the FPGA and the GPU to obtain the beam-formed data. Further explanation will be provided below.

1. FPGA and GPU are Configured to Complete all Steps of One or More Beam Forming Procedures, Respectively.

In some embodiments, the beam former 30 can perform beam forming on the channel echo data with one or more beam forming procedures. For example, the beam former 30 can perform beam forming on the channel echo data with one or more beam forming procedures, including but not limited to: the DAS procedure, the adaptive beam forming procedure, the coherent beam forming procedure, the incoherent beam forming procedure, and/or the frequency domain beam forming procedure. In some embodiments, the FPGA can perform all the steps of at least one of the beam forming procedures (such as the DAS procedure) to complete the beam forming for the channel echo data to obtain the beam-formed data. In some embodiments, the GPU can perform all steps of at least one of the beam forming procedures (such as one or more of the DAS procedure, the adaptive beam forming procedure, the coherent beam forming procedure, the incoherent beam forming procedure, and the frequency domain beam forming procedure) to complete the beam forming for the channel echo data to obtain the beam-formed data.

In some embodiments, for a same group of channel echo data: the FPGA is configured to perform beam forming on a first part data of the same group of channel echo data to obtain beam-formed data corresponding to the first part data; and the GPU is configured to perform beam forming on a remaining second part data of the same group of channel echo data to obtain beam-formed data corresponding to the second part data. The beam forming procedure (the beam forming algorithm) used by the FPGA for beam forming the first part data of the same group of channel echo data may be identical to or different from the beam forming procedure (the beam forming algorithm) used by the GPU for beam forming the remaining second part data of the same group of channel echo data. This beam forming configuration for FPGA and GPU may be referred to as a fourth cooperative work mode.

FPGA and GPU can perform beam forming on different parts of the same group of channel echo data, which can increase the computational power of the ultrasonic imaging system, improve the frame rate and enhance the time resolution of images.

In some embodiments, the same group of channel echo data comprises channel echo data received by the array elements of the ultrasonic probe 10, in which the first part data is the channel echo data received by a first part of the array elements, and the second part data is the channel echo data received by a remaining second part of the array elements. For example, the channel echo data corresponding to a same scanning frame is a same group of channel echo data; or the channel echo data corresponding to a same scanning line is a same group of channel echo data, in which the first part data is the channel echo data received by the first part of the array elements, and the second part data is the channel echo data received by the remaining second part of the array elements.

Figure 8:
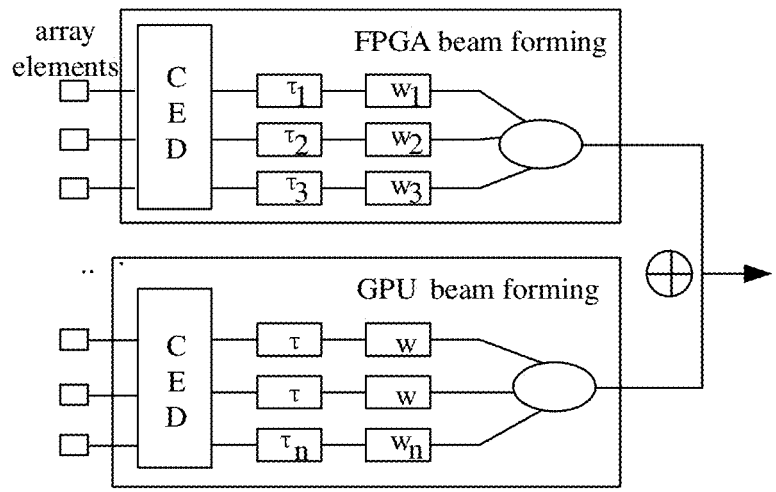
FIG. 8 is a schematic diagram showing some channel echo data being beam formed by a FPGA and some channel echo data being beam formed by a GPU in an embodiment.

FIG. 8 is an example. Some channel echo data is beam formed by the FPGA, and some channel echo data is beam formed by the GPU; accordingly, the results of beam forming by the FPGA and the GPU (i.e., beam-formed data) are combined to obtain the beam-formed data corresponding to all the channel echo data.

In some embodiments, the same group of channel echo data is composed of channel echo data corresponding to a plurality of receiving lines, in which the first part data is channel echo data received by a first part of the receiving lines, and the second part data is channel echo data received by a remaining second part of the receiving lines. For example, the channel echo data corresponding to a same scanning frame is a same group of channel echo data; or the channel echo data corresponding to a same scanning line is a same group of channel echo data, in which the first part data is the channel echo data received by the first part of the receiving lines, and the second part data is the channel echo data received by the remaining second part of the receiving lines.

Figure 9:
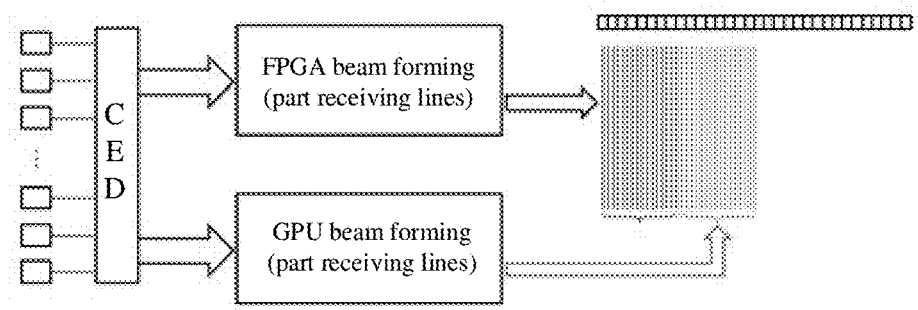
FIG. 9 is a schematic diagram showing some receiving lines being beam formed by a FPGA and some receiving lines being beam formed by a GPU in an embodiment.

FIG. 9 is an example. Some receiving lines are beam formed by the FPGA, and some receiving lines are beam formed by the GPU; accordingly, the results of beam forming by the FPGA and the GPU (i.e., beam-formed data) are combined to obtain the beam-formed data corresponding to all the receiving lines of the same scanning frame or the same scanning line.

In some embodiments, the same group of channel echo data comprises channel echo data corresponding to receiving points with different depths, in which the first part data is channel echo data corresponding to a first part of the receiving points with different depths, and the second part data is channel echo data corresponding to a remaining second part of the receiving points with different depths. For example, the channel echo data corresponding to the same scanning frame is the same group of channel echo data; or the channel echo data corresponding to the same scanning line is the same group of channel echo data, in which the first part data is the channel echo data corresponding to the first part of the receiving points with different depths, and the second part data is the channel echo data corresponding to the remaining second part of the receiving points with different depths.

Figure 10:
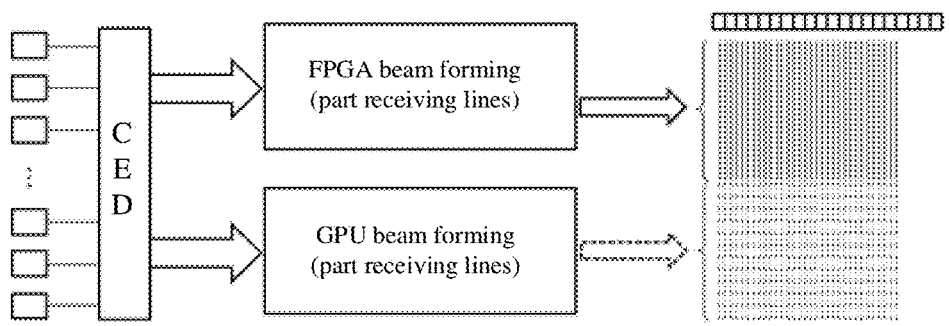
FIG. 10 is a schematic diagram showing some receiving points with different depths being beam formed by a FPGA and some receiving points with different depths being beam formed by a GPU in an embodiment.

FIG. 10 is an example. Some receiving points with different depths are beam formed by the FPGA, and some receiving points with different depths are beam formed by the GPU; accordingly, the results of beam forming by the FPGA and the GPU (i.e., beam-formed data) are combined to obtain the beam-formed data corresponding to all the receiving points with different depths of the same scanning frame or the same scanning line.

In some embodiments, the FPGA and the GPU are configured to perform beam forming on different groups of channel echo data respectively to obtain the beam-formed data. For example, the FPGA and the GPU are configured to perform beam forming on different groups of channel echo data alternately to obtain the beam-formed data. The meanings of the channel echo data for the same and different groups are described above and will not be repeated here.

This beam forming configuration for FPGA and GPU can be referred to as a third cooperative work mode.

Figure 11A:
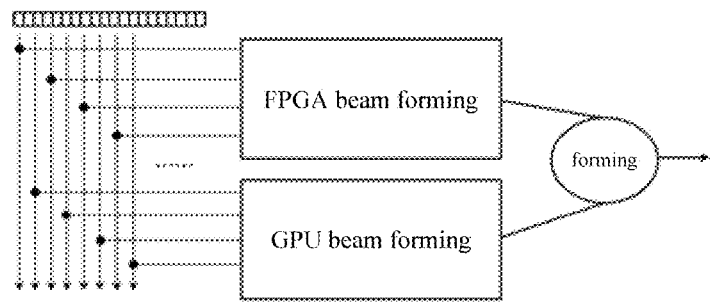
FIG. 11(a) is a schematic diagram of performing beam forming alternately by a FPGA and a GPU in an embodiment.
Figure 11B:
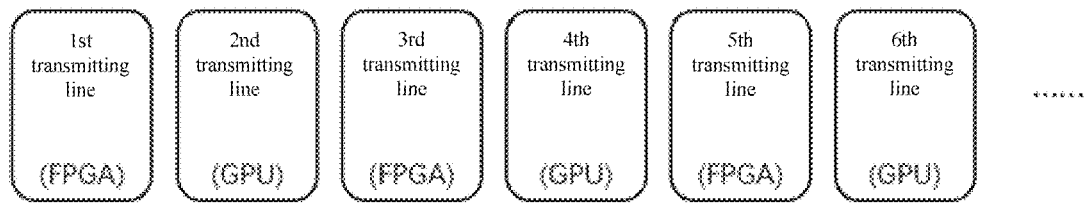
FIG. 11(b) is a schematic diagram of performing beam forming on channel echo data corresponding to transmitting lines by a FPGA and a GPU alternately in an embodiment.
Figure 11C:
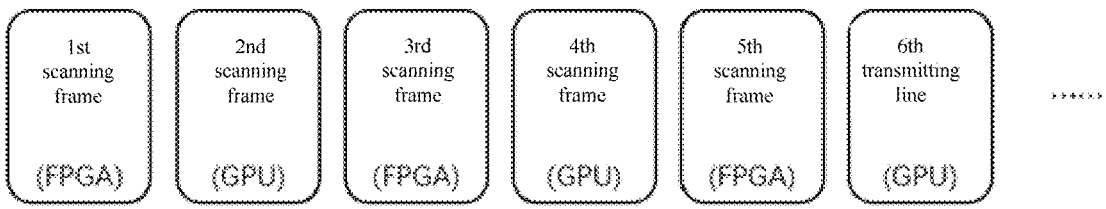
FIG. 11(c) is a schematic diagram of performing beam forming on channel echo data corresponding to scanning frames by a FPGA and a GPU alternately in an embodiment.

Generally, a scanning frame may be formed by each complete imaging area (or a complete area of interest) scanned in the ultrasonic imaging system. A scanning frame may contain n transmitted scanning lines (n≥1), and the channel echo data may be received every time the scanning line is transmitted. A group of channel echo data may be either the channel echo data of a scanning line or the channel echo data of a scanning frame. In the process of ultrasound imaging, the channel echo data in groups is received continuously, and the FPGA and the GPU can alternately process the channel echo data of these groups; correspondingly, the reason is that each transmitted scanning line corresponds to the beam forming of multiple receiving lines, and the time for beam forming is longer than the time for transmission scanning. As shown in FIG. 11 (*a*), the time for beam forming is approximately equal to the scanning time of two transmitted scanning lines, and after beam forming processed alternately by the FPGA and the GPU, the imaging frame rate can reach a maximum state without being affected by the delay of beam forming. FIG. 11(*b*) shows the data flow, and similarly, the scanning frame data can also be alternately processed with the FPGA and the GPU, as shown in FIG. 11(*c*).

In some embodiments, the FPGA may be configured to perform beam forming on channel echo data of first type to obtain beam-formed data of first type, and the GPU may be configured to perform beam forming on channel echo data of second type to obtain beam-formed data of second type. The beam forming procedure (the beam forming algorithm) adopted by the FPGA for beam forming on the channel echo data of first type may be identical to or different from the beam forming procedure (the beam forming algorithm) adopted by the FPGA for beam forming on channel echo data of second type. The image processor 40 may generate an ultrasonic image of first type based on the beam-formed data of first type and may generate an ultrasonic image of second type based on the beam-formed data of second type.

In some embodiments, the ultrasonic image of first type is a B-mode image, and the ultrasonic image of second type is a contrast enhanced ultrasonic image, a C-mode image or an elasticity image. In yet some embodiments, the ultrasonic image of second type is a B-mode image, and the ultrasonic image of first type is a contrast enhanced ultrasonic image, a C-mode image or an elasticity image.

Under multiplex mode, a first-typed scan and a second-typed scan can be performed alternately. In such case, the FPGA is responsible for beam forming the channel echo data of first type, and the GPU is responsible for beam forming the channel echo data of second type. For example, in blood flow color imaging (B-mode image+C-mode image), the FPGA implements B-mode beam forming and the GPU is responsible for real-time color mode beam forming; alternatively, in functional imaging or advanced imaging modes such as contrast enhanced imaging (B-mode image+contrast enhanced image), elasticity imaging (B-mode image+elasticity image), the FPGA implements basic image beam forming (such as B-mode beam forming), and the GPU implements functional image beam forming (such as beam forming of contrast enhanced image or beam forming of elasticity image).

Figure 12:
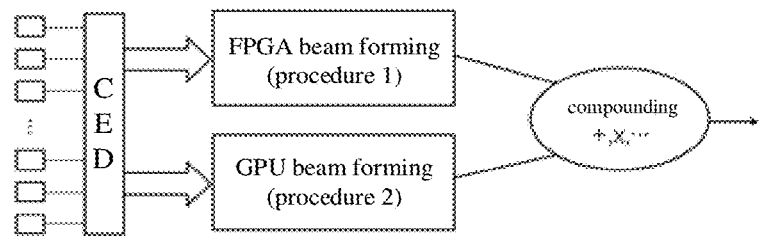
FIG. 12 is a schematic diagram of an embodiment in which a beam former obtains beam-formed data corresponding to the same group of channel echo data based on a first group of beam-formed data and a second group of beam-formed data.
Figure 13:
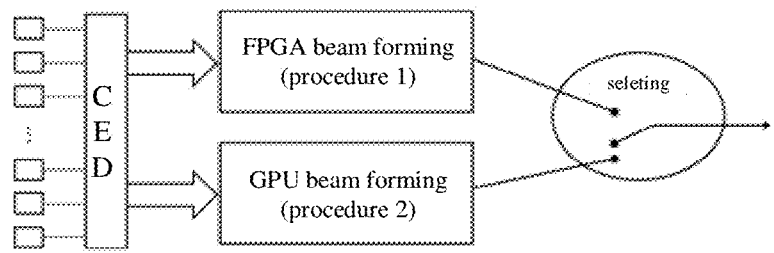
FIG. 13 is a schematic diagram of an embodiment in which a beam former obtains beam-formed data corresponding to the same group of channel echo data based on a first group of beam-formed data and a second group of beam-formed data.

In some embodiments, the FPGA is capable of performing all steps of first beam forming procedure, and the GPU is capable of performing all steps of second beam forming procedure. It shall be understood that the first beam forming procedure and the second beam forming procedure are different. For the same group of channel echo data: the FPGA can perform beam forming on the same group of channel echo data by using the first beam forming procedure to obtain a first group of beam-formed data; and the GPU can perform beam forming on the same group of channel echo data by using the second beam forming procedure to obtain a second group of beam-formed data. The beam former 30 can obtain the beam-formed data corresponding to the same group of channel echo data based on the first group of beam-formed data and the second group of beam-formed data. For example, please refer to FIG. 12, the beam former 30 performs compounding (e.g., weighting and summation) to obtain beam-formed data corresponding to the same group of channel echo data based on the first group of beam-formed data and the second group of beam-formed data. For example, please refer to FIG. 13, the beam former 30 selects one from the first group of beam-formed data and the second group of beam-formed data as the beam-formed data corresponding to the same group of channel echo data. This beam forming configuration for FPGA and GPU can be referred to as a second cooperative work mode.

Due to the advantages and disadvantages of different beam forming procedures, with the above scheme, the imaging quality of ultrasonic images can be improved.

2. FPGA and GPU are Configured to Complete Some Steps of One or More Beam Forming Procedures.

In some embodiments, the beam former 30 can perform beam forming on the channel echo data with one or more beam forming procedures. For example, the beam former 30 can perform beam forming on the channel echo data with one or more beam forming procedures, including but not limited to: the DAS procedure, the adaptive beam forming procedure, the coherent beam forming procedure, the incoherent beam forming procedure, and/or the frequency domain beam forming procedure. In some embodiments, the FPGA is capable of performing some steps of at least one of the beam forming procedures and the GPU is capable of performing remaining steps of the at least one of the beam forming procedures, so that they can cooperatively perform beam forming on the channel echo data. This beam forming configuration for FPGA and GPU can be referred to as a first cooperative work mode.

For example, the FPGA is capable of performing some steps of the DAS procedure, and the GPU is capable of performing the remaining steps of the DAS procedure. For another example, the FPGA is capable of performing some steps of the adaptive beam forming procedure, and the GPU is capable of performing the remaining steps of the adaptive beam forming procedure. For yet another example, the FPGA is capable of performing some steps of the coherent beam forming procedure, and the GPU is capable of performing the remaining steps of the coherent beam forming procedure. For still another example, the FPGA is capable of performing some steps of the incoherent beam forming procedure, and the GPU is capable of performing the remaining steps of the incoherent beam forming procedure. For yet still another example, the FPGA is capable of performing some steps of the frequency domain beam forming procedure, and the GPU is capable of performing the remaining steps of the frequency domain beam forming procedure.

FPGA and GPU can perform beam forming on different parts of the same group of channel echo data, which can increase the computational power of the ultrasonic imaging system, improve the frame rate and enhance the time resolution of images.

Take the adaptive beam forming procedure as an example to illustrate how FPGA and GPU work together to complete all the steps of a beam forming procedure.

Figure 14:
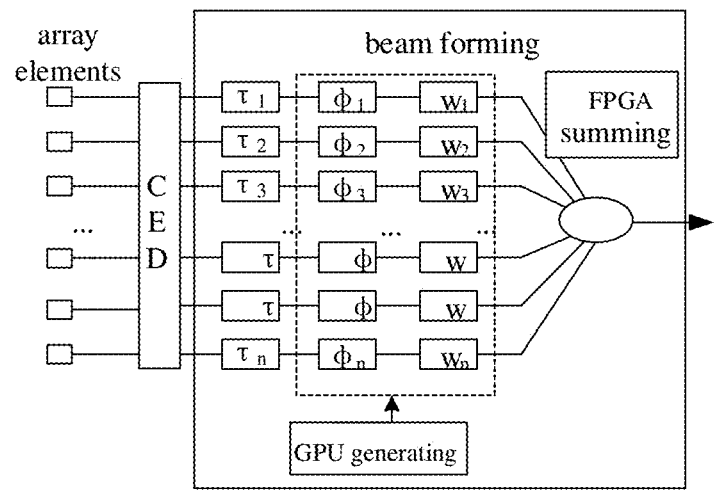
FIG. 14 is a schematic diagram of an embodiment in which beam forming is performed on the channel echo data cooperatively by a FPGA performing some steps of an adaptive beam forming procedure and a GPU performing remaining steps of the adaptive beam forming procedure.
Figure 15:
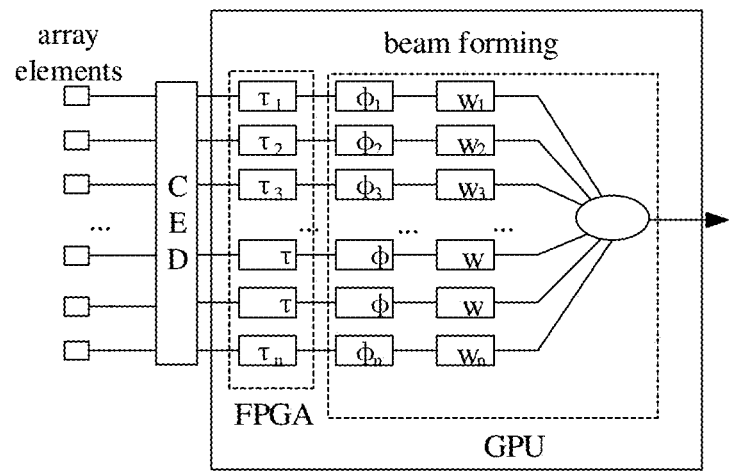
FIG. 15 is a schematic diagram of an embodiment in which beam forming is performed on the channel echo data cooperatively by a FPGA performing some steps of an adaptive beam forming procedure and a GPU performing remaining steps of the adaptive beam forming procedure.

In some embodiments, the FPGA is capable of performing some steps of the adaptive beam forming procedure and the GPU is capable of performing remaining steps of the adaptive beam forming procedure, so that they can perform beam forming on the channel echo data cooperatively. In some embodiments, the adaptive beam forming procedure comprises a delay sequencing step, an apodized coefficient calculating step, a phase coefficient calculating step and a summing step. Please refer to FIG. 14, in some embodiments, the FPGA is configured to perform the delay sequencing step and the summing step, and the GPU is configured to perform the apodized coefficient calculating step and the phase coefficient calculating step. Please refer to FIG. 15, in some embodiments, the FPGA is configured to perform the delay sequencing step, and the GPU is configured to perform the apodized coefficient calculating step, the phase coefficient calculating step and the summing step.

The above illustrates some examples of the beam former 30 in which the FPGA and the GPU are configured to work together for beam forming. The beam forming functions of the FPGA and the GPU can be divided and combined in various ways. In different application scenarios, different strategies can be selected through the beam former 30, which may be preset according to different application scenarios or be selected by a user through a human-computer interaction unit 70. Some examples of beam forming can also be carried out through the user's selection of how the FPGA and the GPU are configured for beam forming, for example, a plurality of cooperative work modes are preset in the system for the user to select. In a first exemplary scenario where higher frame rates are required for such as cardiac or blood flow scans, the FPGA and the GPU are configured as follows: for the same group of channel echo data, the FPGA is configured to perform beam forming on a first part data of the same group of channel echo data to obtain beam-formed data corresponding to the first part data, and the GPU is configured to perform beam forming on a remaining second part data of the same group of channel echo data to obtain beam-formed data corresponding to the second part data. In a second exemplary scenario where clearer observation of lesions are required for such as when scanning difficult-to-image patients or positive lesions, the FPGA and the GPU are configured as follows: for the same group of channel echo data, the FPGA being capable of performing all steps of the first beam forming procedure, and the GPU being capable of performing all steps of the second beam forming procedure.

In some embodiments, the beam former 30 may include a plurality of beam forming work modes. In yet some embodiments, each beam forming work mode corresponds to a cooperative work mode under which the channel echo data is performed with beam forming by the FPGA and the GPU.

Figure 16:
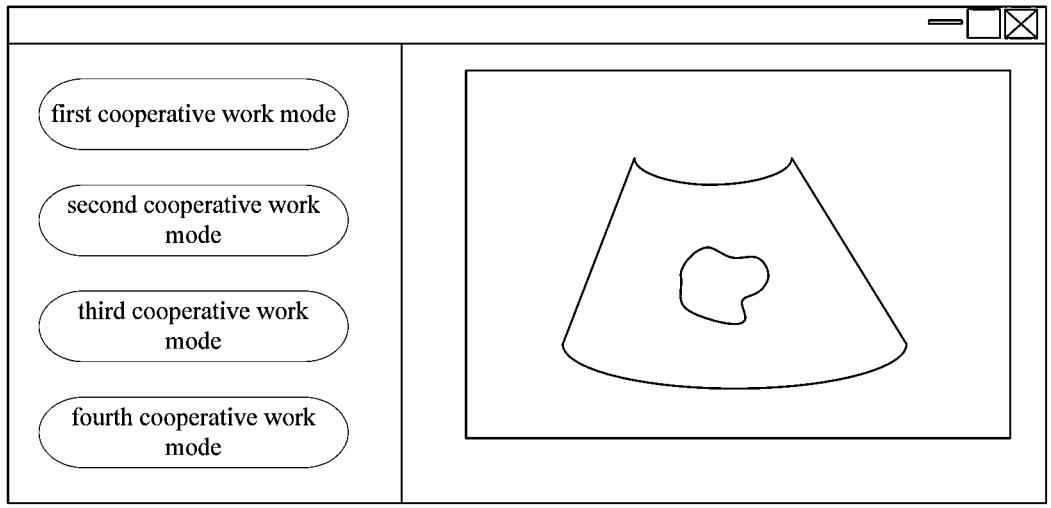
FIG. 16 is a schematic diagram of an embodiment in which a plurality of beam forming work modes for selection may be shown.

In some embodiments, the display 50 is capable of displaying the plurality of beam forming work modes for the user to select the current beam forming work mode; for example, the user can select a beam forming work mode from the plurality of beam forming work modes through the human-computer interaction unit 70. FIG. 16 is an example.

The beam former 30 may perform configuration about beam forming for the FPGA and the GPU based on the current beam forming work mode so as to perform beam forming on the channel echo data to obtain the beam-formed data.

In some embodiments, the plurality of beam forming work modes may include the first cooperative work mode under which the beam former 30 performs configuration about beam forming for the FPGA and the GPU, such that: the FPGA is capable of performing some steps of the first beam forming procedure and the GPU is capable of performing remaining steps of the first beam forming procedure so as to perform beam forming on the channel echo data cooperatively to obtain the beam-formed data. In some embodiments, the first beam forming procedure may be the DAS procedure, the adaptive beam forming procedure, the coherent beam forming procedure, the incoherent beam forming procedure, or the frequency domain beam forming procedure. Here take the adaptive beam forming procedure as an example to illustrate how FPGA and GPU work together to complete all the steps of a beam forming procedure.

In some embodiments, the FPGA is capable of performing some steps of an adaptive beam forming procedure and the GPU is capable of performing remaining steps of the adaptive beam forming procedure so as to perform beam forming on the channel echo data. In yet some embodiments, the adaptive beam forming procedure comprises a delay sequencing step, an apodized coefficient calculating step, a phase coefficient calculating step and a summing step. In still some embodiments, the FPGA is configured to perform the delay sequencing step and the summing step, and the GPU is configured to perform the apodized coefficient calculating step and the phase coefficient calculating step. In yet still some embodiments, the FPGA is configured to perform the delay sequencing step, and the GPU is configured to perform the apodized coefficient calculating step, the phase coefficient calculating step and the summing step.

In some embodiments, the plurality of beam forming work modes comprises a second cooperative work mode, under which the beam former 30 performs configuration about beam forming for the FPGA and the GPU such that, for a same group of channel echo data: the FPGA performs beam forming on the same group of channel echo data with a first beam forming procedure to obtain a first group of beam-formed data, and the GPU performs beam forming on the same group of channel echo data with a second beam forming procedure to obtain a second group of beam-formed data; and the beam former 30 obtains beam-formed data corresponding to the same group of channel echo data based on the first group of beam-formed data and the second group of beam-formed data. For example, the beam former 30 performs compounding (e.g., weighting and summation) to obtain the beam-formed data corresponding to the same group of channel echo data based on the first group of beam-formed data and the second group of beam-formed data. For another example, the beam former 30 selects one from the first group of beam-formed data and the second group of beam-formed data as the beam-formed data corresponding to the same group of channel echo data. It shall be understood that the first beam forming procedure and the second beam forming procedure are different.

In some embodiments, the plurality of beam forming work modes comprises a third cooperative work mode, under which the beam former 30 performs configuration about beam forming for the FPGA and the FPGA such that the FPGA and the GPU are configured to perform beam forming on different groups of channel echo data respectively to obtain the beam-formed data. In some embodiments, the FPGA is configured to perform beam forming on channel echo data of first type to obtain beam-formed data of first type, the GPU is configured to perform beam forming on channel echo data of second type to obtain beam-formed data of second type. The beam forming procedure (the beam forming algorithm) used by the FPGA for beam forming on the channel echo data of first type may be identical to or different from the beam forming procedure (the beam forming algorithm) used by the GPU for beam forming on the channel echo data of first type. The image processor 40 is configured to generate an ultrasonic image of first type based on the beam-formed data of first type and generate an ultrasonic image of second type based on the beam-formed data of second type. In some embodiments, the ultrasonic image of first type is a B-mode image and the ultrasonic image of second type is a contrast enhanced ultrasonic image, a C-mode image or an elasticity image. In some embodiments, the ultrasonic image of second type is a B-mode image and the ultrasonic image of first type is a contrast enhanced ultrasonic image, a C-mode image or an elasticity image. The first-typed scan and the second-typed scan can be performed alternately; under such case, the FPGA is responsible for beam forming the channel echo data of first type, and the GPU is responsible for beam forming the channel echo data of second type. For example, in blood flow color imaging (B-mode image+C-mode image), the FPGA implements B-mode beam forming and the GPU is responsible for real-time color mode beam forming; alternatively, in functional imaging or advanced imaging modes such as contrast enhanced imaging (B-mode image+contrast enhanced image), elasticity imaging (B-mode image+elasticity image), the FPGA implements basic image beam forming (such as B-mode beam forming), and the GPU implements functional image beam forming (such as beam forming of contrast enhanced image or beam forming of elasticity image).

In some embodiments, the beam former 30 can autonomously select a beam forming work mode from the plurality of beam forming work modes; for example, selecting based on which tissue and organ of the human body the current region of interest belongs to, or for another example, selecting based on the current imaging target. The imaging target may be either high frame rate or high quality (i.e., clearer). When the imaging target is high frame rate, the beam former 30 may select the fourth cooperative work mode, the third cooperative work mode or the second cooperative work mode; and when the imaging target is high quality, the beam former 30 may choose the second cooperative work mode. The imaging target can be set by the user through the human-computer interaction unit 70, or it may be associated with the region of interest in advance, or it can be associated with the first and second scenarios mentioned above.

Figure 17:
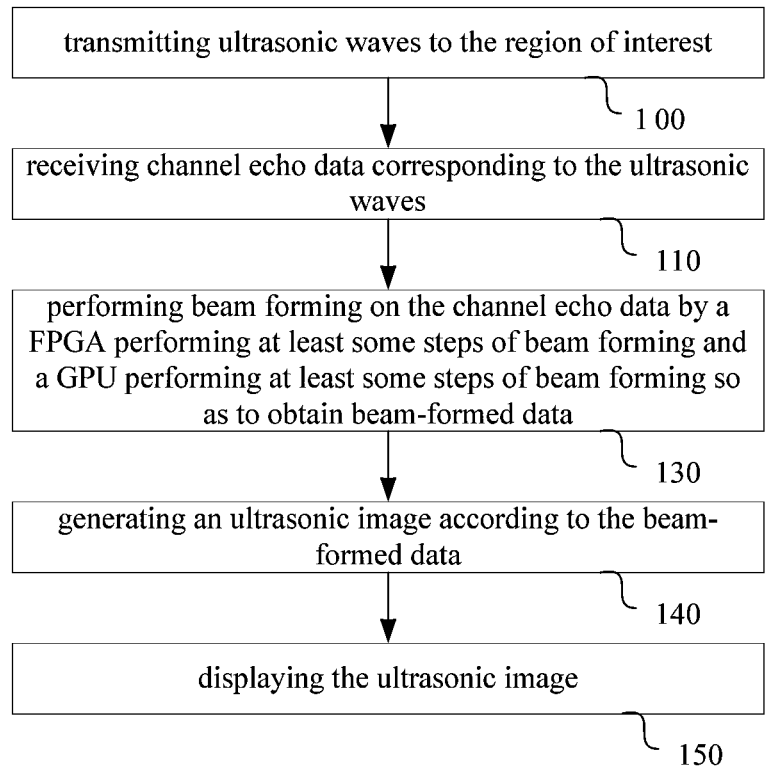
FIG. 17 is a flowchart of an ultrasonic imaging method in an embodiment.

Please refer to FIG. 17, an ultrasonic imaging method disclosed in some embodiments may include the following steps:

Step 100: transmitting ultrasonic waves to the region of interest;

Step 110: receiving channel echo data corresponding to the ultrasonic waves;

Step 130: performing beam forming on the channel echo data by a FPGA performing at least some steps of beam forming and a GPU performing at least some steps of beam forming so as to obtain beam-formed data;

Step 140: generating an ultrasonic image according to the beam-formed data; and Step 150: displaying the ultrasonic image.

Below is a detailed explanation of how the FPGA and the GPU work together to complete beam forming in step 130.

In some embodiments, for the same group of channel echo data: a first part data of the same group of channel echo data is beam formed by the FPGA performing all steps of a beam forming procedure to obtain beam-formed data corresponding to the first part data in step 130, and a second part data of the same group of channel echo data is beam formed by the GPU performing all steps of a beam forming procedure to obtain beam-formed data corresponding to the second part data in step 130. The beam forming procedure (the beam forming algorithm) adopted by the FPGA for beam forming on a first part data of the same group of channel echo data may be identical to or different from the beam forming procedure (the beam forming algorithm) adopted by the FPGA for beam forming on a remaining second part data of the same group of channel echo data. This beam forming configuration for FPGA and GPU can be referred to as a fourth cooperative work mode.

In some embodiments, the same group of channel echo data may comprise the channel echo data received by the plurality of array elements in the ultrasonic probe 10; wherein the first part data is channel echo data received by a first part of the array elements, and the second part data is channel echo data received by a remaining second part of the array elements. For example, the channel echo data corresponding to a same scanning frame is the same group of channel echo data; or the channel echo data corresponding to the same scanning line is the same group of channel echo data; wherein the first part data is channel echo data received by the first part of the array elements, and the second part data is channel echo data received by the remaining second part of the array elements.

In some embodiments, the same group of channel echo data comprises channel echo data corresponding to a plurality of receiving lines, wherein the first part data is channel echo data received by a first part of the receiving lines, and the second part data is channel echo data received by a remaining second part of the receiving lines. For example, the channel echo data corresponding to the same scanning frame is the same group of channel echo data; or the channel echo data corresponding to the same scanning line is the same group of channel echo data, wherein the first part data is the channel echo data received by the first part of the receiving lines, and the second part data is the channel echo data received by the remaining second part of the receiving lines.

In some embodiments, the same group of channel echo data comprises channel echo data corresponding to receiving points with different depths, wherein the first part data is channel echo data corresponding to a first part of the receiving points with different depths, and the second part data is channel echo data corresponding to a remaining second part of the receiving points with different depths. For example, the channel echo data corresponding to the same scanning frame is the same group of channel echo data; or the channel echo data corresponding to the same scanning line is the same group of channel echo data, wherein the first part data is the channel echo data corresponding to the first part of the receiving points with different depths, and the second part data is the channel echo data corresponding to the remaining second part of the receiving points with different depths.

In some embodiments, in step 130, different groups of channel echo data may be beam formed by the FPGA performing all steps of a beam forming procedure and a GPU performing all steps of a beam forming procedure, respectively, to obtain the beam-formed data. For example, in step 130, different groups of channel echo data may be performed with beam forming by the FPGA and the GPU in an alternated manner to obtain the beam-formed data. This beam forming configuration for FPGA and GPU can be referred to as a third cooperative work mode.

In some embodiments, the channel echo data of first type may be beam formed by the FPGA to obtain the beam-formed data of first type in step 130, and the channel echo data of second type may be beam formed by the GPU to obtain the beam-formed data of second type in step 130. The beam forming procedure (the beam forming algorithm) adopted by the FPGA for beam forming on the channel echo data of first type may be identical to or different from the beam forming procedure (the beam forming algorithm) adopted by the FPGA for beam forming on channel echo data of second type. In step 130, the ultrasonic image of first type may be generated based on the beam-formed data of first type and an ultrasonic image of second type may be generated based on the beam-formed data of second type.

In some embodiments, the ultrasonic image of first type is a B-mode image, and the ultrasonic image of second type is a contrast enhanced ultrasonic image, a C-mode image or an elasticity image. In yet some embodiments, the ultrasonic image of second type is a B-mode image, and the ultrasonic image of first type is a contrast enhanced ultrasonic image, a C-mode image or an elasticity image.

In some embodiments, for the same group of channel echo data: the same group of channel echo data may be beam formed by the FPGA performing all the steps of the first beam forming procedure to obtain the first group of beam-formed data in step 130, and the same group of channel echo data may be beam formed by the GPU performing all the steps of the second beam forming procedure to obtain the second group of beam-formed data in step 130. It shall be understood that, the first beam forming procedure and the second beam forming procedure are different. In step 130, the beam-formed data corresponding to the same group of channel echo data may be obtained based on the first group of beam-formed data and the second group of beam-formed data. For example, in step 130, compounding (e.g., weighting and summation) may be performed based on the first group of beam-formed data and the second group of beam-formed data to obtain the beam-formed data corresponding to the same group of channel echo data. For another example, in step 130, one group of beam-formed data may be selected from the first group of beam-formed data and the second group of beam-formed data as the beam-formed data corresponding to the same group of channel echo data. This beam forming configuration for FPGA and GPU can be referred to as a second cooperative work mode.

In some embodiments, in step 130, the channel echo data may be beam formed cooperatively by the FPGA performing some steps of a beam forming procedure and the GPU performing remaining steps of the beam forming procedure. This beam forming configuration for FPGA and GPU can be referred to as a first cooperative work mode.

Take the adaptive beam forming procedure as an example to illustrate how FPGA and GPU work together to complete all the steps of a beam forming procedure.

In some embodiments, the FPGA is capable of performing some steps of an adaptive beam forming procedure and the GPU is capable of performing remaining steps of the adaptive beam forming procedure so as to cooperatively perform beam forming on the channel echo data. In some embodiments, the adaptive beam forming procedure comprises a delay sequencing step, an apodized coefficient calculating step, a phase coefficient calculating step and a summing step. In some embodiments, the delay sequencing step and the summing step are performed by the FPGA in step 130, and the apodized coefficient calculating step and the phase coefficient calculating step are performed by the GPU in step 130. In some embodiments, the delay sequencing step is performed by the FPGA in step 130, and the apodized coefficient calculating step, the phase coefficient calculating step and the summing step are performed by the GPU in step 130.

Figure 18:
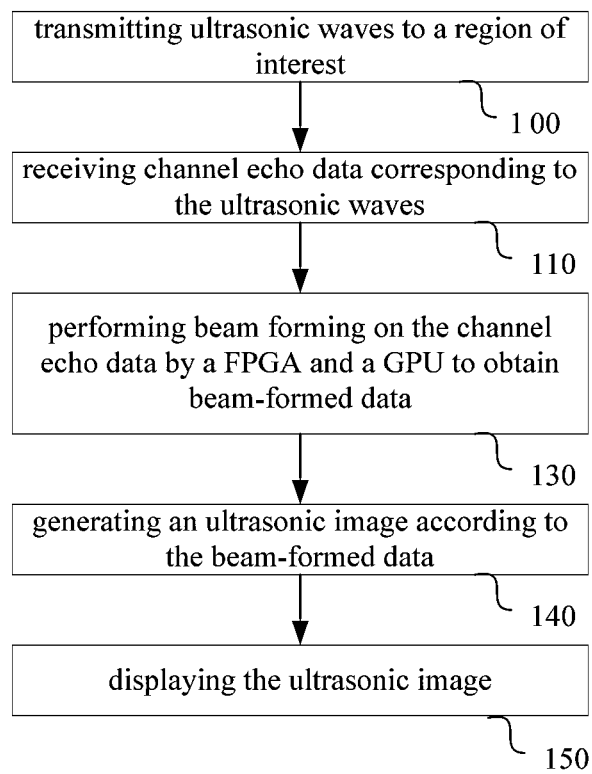
FIG. 18 is a flowchart of an ultrasonic imaging method in an embodiment.

Please refer to FIG. 18, an ultrasonic imaging method disclosed in some embodiments may include the following steps:
Step 100: transmitting ultrasonic waves to a region of interest;
Step 110: receiving channel echo data corresponding to the ultrasonic waves;
Step 130: performing beam forming on the channel echo data by a FPGA and a GPU to obtain beam-formed data;
Step 140: generating an ultrasonic image according to the beam-formed data; and
Step 150: displaying the ultrasonic image.

Figure 19:
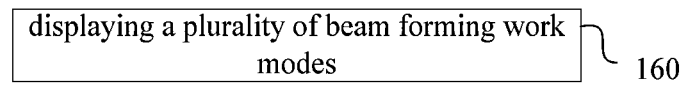
FIG. 19 is a flowchart of an ultrasonic imaging method in an embodiment.

Please refer to FIG. 19, in some embodiments, the ultrasonic imaging method may further include step 160: displaying a plurality of beam forming work modes for a user to select a current beam forming work mode; such that in step 130 the channel echo data may be beam formed by the FPGA and the GPU that are, according to the current beam forming work mode, configured in regard to beam forming so as to obtain the beam-formed data.

In some embodiments, the plurality of beam forming work modes comprises a first cooperative work mode, under which the FPGA and the GPU are performed with configuration about beam forming such that: the channel echo data may be beam formed cooperatively by the FPGA being capable of performing some steps of a first beam forming procedure and the GPU being capable of performing remaining steps of the first beam forming procedure so as to obtain the beam-formed data. In some embodiments, the first beam forming procedure may be the DAS procedure, the adaptive beam forming procedure, the coherent beam forming procedure, the incoherent beam forming procedure, or the frequency domain beam forming procedure. Here take the adaptive beam forming procedure as an example to illustrate how FPGA and GPU work together to complete all the steps of a beam forming procedure.

In some embodiments, the channel echo data may be beam formed cooperatively by the FPGA being capable of performing some steps of an adaptive beam forming procedure and the GPU being capable of performing remaining steps of the adaptive beam forming procedure. In yet some embodiments, the adaptive beam forming procedure comprises a delay sequencing step, an apodized coefficient calculating step, a phase coefficient calculating step and a summing step. In still some embodiments, the delay sequencing step and the summing step may be performed by the FPGA, and the apodized coefficient calculating step and the phase coefficient calculating step may be performed by the GPU. In yet still some embodiments, the delay sequencing step may be performed by the FPGA, and the apodized coefficient calculating step, the phase coefficient calculating step and the summing step may be performed by the GPU.

In some embodiments, the plurality of beam forming work modes comprises a second cooperative work mode under which the FPGA and the GPU are configured in regard to beam forming in step 130, such that for a same group of channel echo data: the FPGA performs beam forming on the same group of channel echo data with a first beam forming procedure to obtain a first group of beam-formed data, the GPU performs beam forming on the same group of channel echo data with a second beam forming procedure to obtain a second group of beam-formed data; and the beam-formed data corresponding to the same group of channel echo data may be obtained based on the first group of beam-formed data and the second group of beam-formed data in step 130. For example, in step 130, compounding (e.g., weighting and summation) may be performed to obtain the beam-formed data corresponding to the same group of channel echo data based on the first group of beam-formed data and the second group of beam-formed data. For another example, one from the first group of beam-formed data and the second group of beam-formed data may be selected as the beam-formed data corresponding to the same group of channel echo data in step 130. It shall be understood that the first beam forming procedure and the second beam forming procedure are different.

In some embodiments, the plurality of beam forming work modes comprises a third cooperative work mode under which the FPGA and the FPGA are configured in regard to beam forming in step 130 such that: the FPGA and the GPU are configured to perform beam forming on different groups of channel echo data respectively to obtain the beam-formed data. In some embodiments, the FPGA is configured to perform beam forming on channel echo data of first type to obtain beam-formed data of first type, and the GPU is configured to perform beam forming on channel echo data of second type to obtain beam-formed data of second type. The beam forming procedure (beam forming algorithm) adopted by the FPGA for beam forming on the channel echo data of first type may be identical to or different from the beam forming procedure (beam forming algorithm) adopted by the GPU for beam forming on the channel echo data of first type. In step 140, the ultrasonic image of first type may be generated based on the beam-formed data of first type, and the ultrasonic image of second type may be generated based on the beam-formed data of second type. In some embodiments, the ultrasonic image of first type is a B-mode image, and the ultrasonic image of second type is a contrast enhanced ultrasonic image, a C-mode image or an elasticity image. In some embodiments, the ultrasonic image of second type is a B-mode image, and the ultrasonic image of first type is a contrast enhanced ultrasonic image, a C-mode image or an elasticity image. The first-typed scan and the second-typed scan can be performed alternately; under such case, the FPGA is responsible for beam forming the channel echo data of first type, and the GPU is responsible for beam forming the channel echo data of second type. For example, in blood flow color imaging (B-mode image+C-mode image), the FPGA implements B-mode beam forming and the GPU is responsible for real-time color mode beam forming; alternatively, in functional imaging or advanced imaging modes such as contrast enhanced imaging (B-mode image+contrast enhanced image), elasticity imaging (B-mode image+elasticity image), the FPGA implements basic image beam forming (such as B-mode beam forming), and the GPU implements functional image beam forming (such as beam forming of contrast enhanced image or beam forming of elasticity image), etc.

In some embodiments, a beam forming work mode can be autonomously selected from the plurality of beam forming work modes in step 130; for example, selecting based on which tissue and organ of the human body the current region of interest belongs to, or for another example, selecting based on the current imaging target. The imaging target may be either high frame rate or high quality (i.e., clearer). When the imaging target is high frame rate, the fourth cooperative work mode may be selected in step 130, the third cooperative work mode or the second cooperative work mode; and when the imaging target is high quality, the second cooperative work mode may be selected in step 130. The imaging target can be set by the user through the human-computer interaction unit 70, or it may be associated with the region of interest in advance, or it can be associated with the first and second scenarios mentioned above.

The present disclosure is illustrated with reference to various exemplary embodiments. However, those skilled in the art may recognize that the exemplary embodiments can be changed and modified without departing from the scope of the present disclosure. For example, various operation steps and components used to execute the operation steps may be implemented in different ways (for example, one or more steps may be deleted, modified, or combined into other steps) according to specific application(s) or any number of cost functions associated with the operation of the system.

In the above embodiments, it can be fully or partially implemented through software, hardware, firmware, or any combination thereof. In addition, as understood by those skilled in the art, the principles herein may be reflected in a computer program product on a computer-readable storage medium that is preloaded with computer-readable program code. Any tangible, non-temporary computer-readable storage medium can be used, including magnetic storage devices (hard disks, floppy disks, etc.), optical storage devices (CD-ROMs, DVDs, Blu Ray disks, etc.), flash memory and/or the like. The computer program instructions may be loaded onto a general purpose computer, a special purpose computer, or other programmable data processing device to form a machine, so that these instructions executed on a computer or other programmable data processing device can form a device that realizes a specified function. These computer program instructions may also be stored in a computer-readable memory that can instruct a computer or other programmable data processing device to run in a specific way, so that the instructions stored in the computer-readable memory can form a manufacturing product, including a realization device to achieve a specified function. The computer program instructions may also be loaded onto a computer or other programmable data processing device to execute a series of operating steps on the computer or other programmable device to produce a computer-implemented process, so that instructions executed on the computer or other programmable device can provide steps for implementing a specified function.

Although the principles herein have been shown in various embodiments, many modifications to structures, arrangements, proportions, elements, materials, and components that are specifically adapted to specific environmental and operational requirements may be used without deviating from the principles and scope of the present disclosure. These and other modifications and amendments will be included in the scope of the present disclosure.

The foregoing specific description has been illustrated with reference to various embodiments. However, those skilled in the art will recognize that various modifications and changes can be made without departing from the scope of the present disclosure. Accordingly, the present disclosure is illustrative rather than restrictive, and all such modifications will be included in its scope. Similarly, there are solutions to these and other advantages and problems of the various embodiments as described above. However, the benefits, the advantages, solutions to problems, and any elements that can produce them or make them more explicit should not be interpreted as critical, required, or necessary one. The term "comprise" and any other variations thereof used herein are non-exclusive; accordingly, a process, method, article or device that includes a list of elements may include not only these elements, but also other elements that are not explicitly listed or are not part of said process, method, article or device. In addition, the term "coupling" and any other variations thereof as used herein may refer to physical, electrical, magnetic, optical, communication, functional, and/or any other connection.

Those skilled in the art will realize that many changes can be made to the details of the above embodiments without departing from the basic principles of the present disclosure. The scope of the present disclosure shall therefore be determined in accordance with the claims.

What is claimed is:
1. An ultrasonic imaging system, comprising:
an ultrasonic probe having a plurality of array elements and configured to transmit ultrasonic waves to a region of interest and receive channel echo data corresponding to the ultrasonic waves;
a transmitting and receiving control circuit configured to control the ultrasonic probe to perform transmission of the ultrasonic waves and reception of the channel echo data;
a beam former including a FPGA and a GPU and configured to perform beam forming on the channel echo data by the FPGA and the GPU to obtain beam-formed data;
an image processor configured to generate an ultrasonic image according to the beam-formed data; and
a display configured to display the ultrasonic image;
wherein the beam former has a plurality of beam forming work modes, and the plurality of beam forming work modes comprise at least two of: a first cooperative work mode, a second cooperative work mode, a third cooperative work mode, and a fourth cooperative work mode;
the display is configured to display the plurality of beam forming work modes for a user to select a current beam forming work mode; and the beam former is configured to perform configuration about beam forming for the FPGA and the GPU under the current beam forming work mode so as to perform the beam forming on the channel echo data to obtain the beam-formed data, wherein in response to the current beam forming work mode being the first cooperative work mode, the FPGA is configured to perform some steps of a first beam forming procedure and the GPU is configured to perform remaining steps of the first beam forming procedure so as to perform the beam forming on the channel echo data cooperatively to obtain the beam-formed data;

in response to the current beam forming work mode being the second cooperative work mode, the FPGA is configured to perform the beam forming on a same group of channel echo data with a second beam forming procedure to obtain a first group of beam-formed data, the GPU is configured to perform the beam forming on the same group of channel echo data with a third beam forming procedure to obtain a second group of beam-formed data, and the beam former is configured to obtain beam-formed data corresponding to the same group of channel echo data based on the first group of beam-formed data and the second group of beam-formed data;

in response to the current beam forming work mode being the third cooperative work mode, the FPGA and the GPU are configured to perform the beam forming on different groups of channel echo data respectively to obtain the beam-formed data; and in response to the current beam forming work mode being the fourth cooperative work mode, the FPGA is configured to perform the beam forming on a first part data of a same group of channel echo data to obtain first beam-formed data corresponding to the first part data, the GPU is configured to perform the beam forming on a remaining second part data of the same group of channel echo data to obtain second beam-formed data corresponding to the remaining second part data, and the beam former is configured to obtain beam-formed data corresponding to the same group of channel echo data based on the first beam-formed data and the second beam-formed data.

2. The ultrasonic imaging system according to claim 1, wherein in response to the current beam forming work mode being the second cooperative work mode, the beam former being configured to obtain the beam-formed data corresponding to the same group of channel echo data based on the first group of beam-formed data and the second group of beam-formed data comprises:

the beam former being configured to perform compounding to obtain the beam-formed data corresponding to the same group of channel echo data based on the first group of beam-formed data and the second group of beam-formed data; or, the beam former being configured to select one from the first group of beam-formed data and the second group of beam-formed data as the beam-formed data corresponding to the same group of channel echo data.

3. The ultrasonic imaging system according to claim 1, wherein in response to the current beam forming work mode being the third cooperative work mode, the FPGA is configured to perform the beam forming on channel echo data of first type to obtain beam-formed data of first type, and the GPU is configured to perform the beam forming on channel echo data of second type to obtain beam-formed data of second type; and the image processor is configured to generate an ultrasonic image of first type based on the beam-formed data of first type and generate an ultrasonic image of second type based on the beam-formed data of second type.

4. The ultrasonic imaging system according to claim 1, wherein channel echo data corresponding to a same scanning frame is a same group of channel echo data; or channel echo data corresponding to a same scanning line is a same group of channel echo data.

5. The ultrasonic imaging system according to claim 1, wherein in response to the current beam forming work mode being the fourth cooperative work mode, the beam former is further configured to perform the beam forming on the channel echo data with one or more beam forming procedures, wherein:

the FPGA is configured to perform all steps of at least one of the one or more beam forming procedures so as to perform the beam forming on the first part data of the same group of the channel echo data to obtain the first beam-formed data, and the GPU is configured to perform all steps of at least one of the one or more beam forming procedures so as to perform the beam forming on the remaining second part data of the same group of the channel echo data to obtain the second beam-formed data.

6. The ultrasonic imaging system according to claim 1, wherein in response to the current beam forming work mode being the fourth cooperative work mode, the same group of channel echo data comprises channel echo data received by the plurality of array elements of the ultrasonic probe, wherein:

the first part data is channel echo data received by a first part of the plurality of array elements, and the remaining second part data is channel echo data received by a remaining second part of the plurality of array elements.

7. The ultrasonic imaging system according to claim 1, wherein in response to the current beam forming work mode being the fourth cooperative work mode, the same group of channel echo data comprises channel echo data corresponding to a plurality of receiving lines, wherein:

the first part data is channel echo data received by a first part of the plurality of receiving lines, and the remaining second part data is channel echo data received by a remaining second part of the plurality of receiving lines.

8. The ultrasonic imaging system according to claim 1, wherein in response to the current beam forming work mode being the fourth cooperative work mode, the same group of channel echo data comprises channel echo data corresponding to receiving points with different depths, wherein:

the first part data is channel echo data corresponding to a first part of the receiving points with different depths, and the remaining second part data is channel echo data corresponding to a remaining second part of the receiving points with different depths.

9. An ultrasonic imaging method, comprising:
transmitting ultrasonic waves to a region of interest;
receiving channel echo data corresponding to the ultrasonic waves;
performing beam forming on the channel echo data by a FPGA and a GPU included in a beam former to obtain beam-formed data;
generating an ultrasonic image according to the beam-formed data; and
displaying the ultrasonic image;

wherein a plurality of beam forming work modes are displayed for a user to select a current beam forming work mode, and the plurality of beam forming work modes comprise at least two of: a first cooperative work mode, a second cooperative work mode, a third cooperative work mode, and a fourth cooperative work mode; and the FPGA and the GPU are configured for the beam forming according to the current beam forming work mode so as to perform the beam forming on the channel echo data to obtain the beam-formed data, wherein in response to the current beam forming work mode being the first cooperative work mode, performing, by the FPGA, some steps of a first beam forming procedure and performing, by the GPU, remaining steps of the first beam forming procedure so as to perform the beam forming on the channel echo data cooperatively to obtain the beam-formed data;

in response to the current beam forming work mode being the second cooperative work mode, performing, by the FPGA, the beam forming on a same group of channel echo data with a second beam forming procedure to obtain a first group of beam-formed data, performing, by the GPU, the beam forming on the same group of channel echo data with a third beam forming procedure to obtain a second group of beam-formed data, and obtaining, by the beam former, beam-formed data corresponding to the same group of channel echo data based on the first group of beam-formed data and the second group of beam-formed data;

in response to the current beam forming work mode being the third cooperative work mode, performing, by the FPGA and the GPU, the beam forming on different groups of channel echo data respectively to obtain the beam-formed data; and in response to the current beam forming work mode being the fourth cooperative work mode, performing, by the FPGA, the beam forming on a first part data of a same group of channel echo data to obtain first beam-formed data corresponding to the first part data, performing, by the GPU, the beam forming on a remaining second part data of the same group of channel echo data to obtain second beam-formed data corresponding to the remaining second part data, and obtaining, by the beam former, beam-formed data corresponding to the same group of channel echo data based on the first beam-formed data and the second beam-formed data.

10. An ultrasonic imaging method, comprising: transmitting ultrasonic waves to a region of interest;

receiving channel echo data corresponding to the ultrasonic waves;

identifying the region of interest, an imaging target, or an imaging mode;

determining a current beam forming work mode among a plurality of beam forming work modes based on the identified region of interest, the identified imaging target, or the identified imaging mode, wherein the plurality of beam forming work modes comprise at least two of: a first cooperative work mode, a second cooperative work mode, a third cooperative work mode, and a fourth cooperative work mode;

performing a beam forming on the channel echo data by a FPGA and a GPU included in a beam former under the current beam forming work mode to obtain beam-formed data;

generating an ultrasonic image according to the beam-formed data; and displaying the ultrasonic image, wherein in response to the current beam forming work mode being the first cooperative work mode, performing, by the FPGA, some steps of a first beam forming procedure and performing, by the GPU, remaining steps of the first beam forming procedure so as to perform the beam forming on the channel echo data cooperatively to obtain the beam-formed data;

in response to the current beam forming work mode being the second cooperative work mode, performing, by the FPGA, the beam forming on a same group of channel echo data with a second beam forming procedure to obtain a first group of beam-formed data, performing, by the GPU, the beam forming on the same group of channel echo data with a third beam forming procedure to obtain a second group of beam-formed data, and obtaining, by the beam former, beam-formed data corresponding to the same group of channel echo data based on the first group of beam-formed data and the second group of beam-formed data;

in response to the current beam forming work mode being the third cooperative work mode, performing, by the FPGA and the GPU, the beam forming on different groups of channel echo data respectively to obtain the beam-formed data; and in response to the current beam forming work mode being the fourth cooperative work mode, performing, by the FPGA, the beam forming on a first part data of a same group of channel echo data to obtain first beam-formed data corresponding to the first part data, performing, by the GPU, the beam forming on a remaining second part data of the same group of channel echo data to obtain second beam-formed data corresponding to the remaining second part data, and obtaining, by the beam former, beam-formed data corresponding to the same group of channel echo data based on the first beam-formed data and the second beam-formed data.

11. The ultrasonic imaging method according to claim 10, wherein determining the current beam forming work mode among the plurality of beam forming work modes based on the identified region of interest comprises:

in response to the identified region of interest containing at least one of a cardiac or a blood flow, determining one of the fourth cooperative work mode, the third cooperative work mode and the first cooperative work mode as the current beam forming work mode; and in response to the identified region of interest containing a lesion, determining the second cooperative work mode as the current beam forming work mode.

12. The ultrasonic imaging method according to claim 10, wherein determining the current beam forming work mode among the plurality of beam forming work modes based on the identified imaging target comprises:

in response to the identified imaging target being a high frame rate, determining one of the fourth cooperative work mode, the third cooperative work mode and the first cooperative work mode as the current beam forming work mode; and in response to the identified imaging target being a high quality, determining the second cooperative work mode as the current beam forming work mode.

13. The ultrasonic imaging method according to claim 10, wherein determining the current beam forming work mode among the plurality of beam forming work modes based on the identified imaging mode comprises:

in response to the identified imaging mode being a blood flow color imaging, determining the third cooperative work mode as the current beam forming work mode; and in response to the identified imaging mode being functional imaging or advanced imaging modes, determining the third cooperative work mode as the current beam forming work mode.

* * * * *